United States Patent
Freundlich et al.

(10) Patent No.: US 11,537,727 B2
(45) Date of Patent: Dec. 27, 2022

(54) SYSTEMS AND METHODS FOR CREATING ENHANCED DOCUMENTS FOR PERFECT AUTOMATED PARSING

(71) Applicant: BOLD Limited, Hamilton (BM)

(72) Inventors: James Freundlich, San Juan, PR (US); John Glase, San Juan, PR (US); Kip Daynard, Huntsville (CA); Pukar Bhandari, San Ramon, CA (US)

(73) Assignee: BOLD LIMITED, Hamilton (BM)

( * ) Notice: Subject to any disclaimer, the term of this patent is extended or adjusted under 35 U.S.C. 154(b) by 0 days.

(21) Appl. No.: 17/207,391

(22) Filed: Mar. 19, 2021

(65) Prior Publication Data
US 2021/0350009 A1 Nov. 11, 2021

Related U.S. Application Data

(63) Continuation of application No. PCT/US2021/021135, filed on Mar. 5, 2021.
(Continued)

(51) Int. Cl.
*G06F 12/14* (2006.01)
*G06F 11/30* (2006.01)
(Continued)

(52) U.S. Cl.
CPC .......... *G06F 21/602* (2013.01); *G06F 16/335* (2019.01); *G06F 16/3323* (2019.01);
(Continued)

(58) Field of Classification Search
CPC .............................. G06F 21/602; G06F 40/205
(Continued)

(56) References Cited

U.S. PATENT DOCUMENTS 6,959,288 B1 * 10/2005 Medina .............. G06Q 20/3829
705/51
9,507,762 B1 11/2016 Lashley et al.
(Continued)

FOREIGN PATENT DOCUMENTS

CN 105678189 A 6/2016

OTHER PUBLICATIONS

Frederic Deguillaume; Protocols for data-hiding based text document security and automatic processing; IEEE:2005; pp. 1-4.*
(Continued)

*Primary Examiner* — Monjur Rahim
(74) *Attorney, Agent, or Firm* — Katten Muchin Rosenman LLP

(57) ABSTRACT

The disclosed enhanced document creation and parsing systems deal with enhanced documents that allow for the presentation of document content in a preferred visual manner, while ensuring that the document content can be captured accurately by an automated parser with nothing being discarded or misrepresented. The enhanced document creation system may create an enhanced document by encoding document content in accordance with a defined schema, optionally encrypting the resulting structured data into an encrypted byte string, and embedding the encrypted byte string as non-visible metadata in a rendered document. The resulting enhanced document can be completely and accurately parsed by an enhanced document parsing system that is capable of extracting, decrypting and decoding the embedded document metadata.

11 Claims, 14 Drawing Sheets

Related U.S. Application Data

(60) Provisional application No. 63/021,968, filed on May 8, 2020.

(51) Int. Cl.

| | | |
|---|---|---|
| *G06F 21/60* | (2013.01) | |
| *G06F 40/205* | (2020.01) | |
| *G06F 16/332* | (2019.01) | |
| *G06F 16/34* | (2019.01) | |
| *G06F 16/335* | (2019.01) | |
| *G06F 16/383* | (2019.01) | |
| *G06F 40/103* | (2020.01) | |
| *G06F 40/166* | (2020.01) | |
| *H04N 1/44* | (2006.01) | |

(52) U.S. Cl.
CPC ............ *G06F 16/34* (2019.01); *G06F 16/383* (2019.01); *G06F 40/103* (2020.01); *G06F 40/166* (2020.01); *G06F 40/205* (2020.01); *H04N 1/4446* (2013.01); *H04N 1/4486* (2013.01)

(58) Field of Classification Search
USPC .......................................................... 713/189
See application file for complete search history.

(56) References Cited

U.S. PATENT DOCUMENTS

| | | | |
|---|---|---|---|
| 9,934,213 B1 | 4/2018 | Dutt et al. | |
| 10,650,086 B1 | 5/2020 | Knudson et al. | |
| 2002/0002468 A1* | 1/2002 | Spagna | G06T 1/0021 713/193 |
| 2004/0139222 A1* | 7/2004 | Slik | G16H 10/60 709/236 |
| 2005/0120290 A1* | 6/2005 | Mistry | G06F 21/6209 715/272 |
| 2006/0041579 A1* | 2/2006 | Miyashita | G06F 40/166 |
| 2006/0089912 A1* | 4/2006 | Spagna | H04W 4/02 705/51 |
| 2007/0203776 A1 | 8/2007 | Austin et al. | |
| 2008/0163364 A1* | 7/2008 | Ferlitsch | G06F 16/93 726/21 |
| 2009/0234784 A1 | 9/2009 | Buriano et al. | |
| 2010/0161717 A1 | 6/2010 | Albrecht et al. | |
| 2010/0332973 A1 | 12/2010 | Kloiber et al. | |
| 2011/0004820 A1 | 1/2011 | Kloiber et al. | |
| 2011/0119481 A1* | 5/2011 | Auradkar | G06F 21/602 713/150 |
| 2011/0145593 A1* | 6/2011 | Auradkar | H04L 9/096 713/189 |
| 2012/0005245 A1* | 1/2012 | Ruiz-Velasco | G06F 16/166 707/822 |
| 2013/0198522 A1* | 8/2013 | Kohno | G06F 21/62 713/182 |
| 2014/0317009 A1 | 10/2014 | Bilodeau et al. | |
| 2015/0082148 A1* | 3/2015 | Lai | G06F 40/151 715/235 |
| 2015/0302218 A1* | 10/2015 | Fielder | G06F 21/6209 713/193 |
| 2017/0052943 A1 | 2/2017 | Owens et al. | |
| 2017/0154027 A1 | 6/2017 | Guzman et al. | |
| 2019/0108205 A1 | 4/2019 | Taylor et al. | |
| 2019/0109710 A1* | 4/2019 | Carino, Jr. | H04N 1/32128 |
| 2020/0134256 A1 | 4/2020 | Kloiber et al. | |
| 2020/0334274 A1* | 10/2020 | Joshi | G06F 9/54 |
| 2021/0049239 A1 | 2/2021 | Li et al. | |
| 2021/0194888 A1 | 6/2021 | Bhaskar S et al. | |
| 2021/0248153 A1 | 8/2021 | Sirangimoorthy et al. | |

OTHER PUBLICATIONS

International Search Report and Written Opinion dated Jun. 16, 2021, from the corresponding International Application No. PCT/US2021/021135.

Alonso Chema et al: Disclosing Private Information from Metadata, hidden info and lost data, 2009, XP055811108, Retrieved from the Internet: URL:https://www.blackhat.com/presentations/bh-europe-09/Alonso_Rando/Blackhat-Europe; 09-Alonso-Rando-Fingerprinting-networks-metadata-whitepaper.pdf; retrieved on Jun. 7, 2021; Sections 1 to 4.

11 Anonymous: The GNU libextractor Reference Manual, Sep. 8, 2012 (Sep. 8, 2012), XP055811224, Retrieved from the Internet: URL:https://www.gnu.org/software/libextrac tor/manual/libextractor.html#toc-Top [retrieved on Jun. 7, 2021] section 3.

Anonymous: "Populate Web forms with JSP and XML—TechRepublic", Nov. 8, 2014 (Nov. 8, 2014), XP055808759, Retrieved from the Internet: URL:https://web.archive.org/web/2014110805 2415/https://www.techrepublic.com/article/ populate-web-forms-with-jsp-and-xml/ [retrieved on May 28, 2021] the whole document.

U.S. Office Action dated Jul. 7, 2021 from related U.S. Appl. No. 17/207,435.

U.S. Office Action dated Jul. 20, 2021 from related U.S. Appl. No. 17/207,354.

U.S. Office Action dated Jul. 22, 2021 from related U.S. Appl. No. 17/207,304.

U.S. Office Action dated Oct. 25, 2021 from related U.S. Appl. No. 17/207,435.

U.S. Notice of Allowance dated Dec. 8, 2021, from related U.S. Appl. No. 17/207,304.

International Search Report and Written Opinion dated Aug. 13, 2021, from the corresponding International Application No. PCT/US2021/021135.

Sanyal Satyaki et al: "Resume Parser withNatural Language Processing", 2017, XP055829963, DOI: 10.13140rg.2.2.11709.05607: Retrieved from the Internet: URL:https://www.researchgate.net/profile/Satyaki-Sanyal/publication/313851778 Resume_Parser with Natural Language Processing/links/58ab134eaca27206d9bcefdl/Resume-Parser-with-Natural-Language-Processing.pdf. [retrieved on Aug. 3, 2012] the whole document.

Nick Winder. "What's Hiding in Your PDF? PSPDFKit", 2018, XP055830116, Retrieved from the Internet: URL:https://pspdfkit.com/blog/2018/whats-hiding-in-your-pdf/. [retrieved on Aug. 4, 2021].

Anonymous: "Salt (cryptography)—Wikipedia" Dec. 9, 2012 (Dec. 9, 2012), XP055830224, Retrieved from the Internet: URL:https://en.wikipedia.org/w/index.php?title=Salt (cryptography)&oldid=930025835; [retrieved on Aug. 4, 2021] the whole document.

Exteneded European Search Report dated Aug. 13, 2021, from the corresponding European Application No. 21171517.2.

Extended European Search Report dated Aug. 13, 2021, from the corresponding European Application No. 21171553.7.

Extended European Search Report dated Aug. 13, 2021, from the corresponding European Application No. 21171557.8.

United States Notice of Allowance dated Sep. 17, 2021, from corresponding U.S. Appl. No. 17/207,354.

U.S. Office Action dated Mar. 4, 2022, from related U.S. Appl. No. 17/207,435.

U.S. Office Action dated Jul. 1, 2022, from related U.S. Appl. No. 17/207,435.

* cited by examiner

FIG. 2

210 — Bar chart with categories: PATTERN DESIGN, VECTOR DESIGN, TRADITIONAL DESIGN, PACKAGING DESIGN, BRANDING 220 —
```
"skillName": "Pattern Design",
"description": "Skill",
"skillProficiency": "EXPERT",
"skillSource": "Graphical", "skillName": "Vector Design",
"description": "Skill",
"skillProficiency": "PROFICIENT",
"skillSource": "Graphical", "skillName": "Traditional Design",
"description": "Skill",
"skillProficiency": "EXPERT",
"skillSource": "Graphical", "skillName": "Packaging Design",
"description": "Skill",
"skillProficiency": "COMPETENT",
"skillSource": "Graphical", "skillName": "Branding Design",
"description": "Skill",
"skillProficiency": "PROFICIENT",
"skillSource": "Graphical",
```

FIG. 4

```
"hobbyName"; "Golf",
"description"; "Hobby",
"hobbySource"; "Graphical",
"hobbyType"; "Emoji", "hobbyName"; "Surfing",
"description"; "Hobby",
"hobbySource"; "Graphical",
"hobbyType"; "Emoji", "hobbyName"; "Running",
"description"; "Hobby",
"hobbySource"; "Graphical",
"hobbyType"; "Emoji", "hobbyName"; "Astronomy",
"description"; "Interest",
"hobbySource"; "Graphical",
"hobbyType"; "Emoji",
```

WHAT HOBBIES DO YOU WANT TO HIGHLIGHT?

IMAGE DESCRIPTION FOR APPLICATION SOFTWARE

HOBBY: GOLF    CHANGE DESCRIPTION

SHOWING RESULTS FOR *GOLF*

GOLF | ADD+ | ADD+ | ADD+ | ADD+

MARKETING ASSISTANT
02/2017-PRESENT                                  CHICAGO
• ASSISTED IN THE CREATION OF PRESS RELEASES AND NEW BLOG POSTS.
• COMPILED AND DISTRIBUTED SUCCESSFULLY THE FINANCIAL AND STATISTICAL INFORMATION, SUCH AS SPREADSHEETS FOR BEST PERFORMING GAMES.
• CONDUCTED PRIMARY RESEARCH WITH USERS PLAYING THE MOST DOWNLOADED GAMES.

HOBBIES & INTERESTS

FROM FIG. 6

```
{
    "Id": "c5c6a55a-d522-48bb-9224-dc6963444230",
    "ParagraphId": 408693730,
    "SectionID": "10ca8201-b51d-43c8-b51e-f6f396b1f7c1",
    "SecId": 629338431,
    "Index": 1,
    "ParagraphTemplateCD": null,
    "TopPadding": null,
    "DocDatas": [
      {
        "Id": "8cf28ceb-3a17-4df8-a944-1a1aedee4dc2",
        "DocDataId": -2138017678,
        "ParagraphID": "c5c6a55a-d522-48bb-9224-dc6963444230",
        "ParaId": 408693730,
        "FieldCD": "FNAM",
        "PartyID": 0,
        "UserId": 0,
        "CharValue": "Jessica",
        "TimeStamp": "2018-04-12T04:44:41.9166393-04:00",
        "DocDataDate": null,
        "DateTimeValue": null,
        "GeoAreaID": null
      },
      {
        "Id": "a106246f-fc16-4e02-a6c3-f3fb664f437e",
        "DocDataId": -2138017677,
        "ParagraphID": "c5c6a55a-d522-48bb-9224-dc6963444230",
        "ParaId": 408693730,
        "FieldCD": "LNAM",
        "PartyID": 0,
        "UserId": "e6e0da5a-ba7a-4e79-ad30-9648e32a283e",
        "CharValue": "Claire",
        "TimeStamp": "2018-04-12T04:44:41.9166393-04:00",
        "DocDataDate": null,
        "DateTimeValue": null,
        "GeoAreaID": null
      }
    ],
    "SectionContainerIndex": 0
},
```

*FIG. 6 CONT.*

SYSTEMS AND METHODS FOR CREATING ENHANCED DOCUMENTS FOR PERFECT AUTOMATED PARSING

BACKGROUND OF THE INVENTION

Field of the Invention

The following disclosure generally relates to systems and methods for creating enhanced electronic documents that allow for perfect parsing of the enhanced documents using automated methods.

Background

Electronic documents are frequently stored in file formats, like Microsoft Word's DOCX format or Adobe Acrobat's PDF format, that allow for documents to be rendered in a manner that is visually appealing to a human reader. But these formats typically store information in an unstructured manner making it difficult for automated parsing software (or parsers) to interpret the electronic document accurately, resulting in misread or miscategorized data. By way of example, a job seeker will typically prepare a precisely formatted resume (e.g., as a DOCX or PDF file) that they may upload in the process of submitting an online job application. The formatted resume is frequently processed through an applicant tracking system (ATS), or other resume review system, which may attempt to parse the resume using parsing software to extract significant information from the resume. The resume review system may use the extracted information to filter resumes to be viewed by human resources personnel at a hiring entity based on pre-selected qualifications or other analysis. If the information is not properly extracted from the job seeker's resume, the resume may never make it to a human reviewer or the human reviewer may be viewing incorrect information about the job seeker. While certain file formats allow for information to be stored in a structured manner (e.g., according to a defined XML or JSON schema), which may improve machine readability, these raw text data formats are unable to capture the manner in which such information is to be visually presented to an individual. A need thus exists for the ability to create electronic documents that are both visually appealing to a human reader and capable of being accurately interpreted by a parser.

BRIEF SUMMARY OF THE INVENTION

The presently disclosed enhanced document creation system seeks to address the above-mentioned limitations that are faced when applying automated parsing techniques to unstructured documents by encoding the document content in accordance with a defined schema, optionally encrypting the resulting structured data into an encrypted byte string, and embedding the encrypted byte string as non-visible metadata in the document. The resulting document can be completely and accurately parsed by an enhanced document parsing system that is capable of extracting, decrypting and decoding the embedded document metadata. In some embodiments, the enhanced document creation system may store the encoded (and optionally encrypted) document content in association with a document identifier, which may instead be embedded as non-visible metadata in the document. In such cases, the enhanced document parsing system may extract the embedded document identifier, request the encoded content associated therewith from the enhanced document creation system, and decode (and decrypt) the structured data received from the enhanced document creation system to perfectly parse the document. In this way, a single document can be created that allows an individual to present the document content in their preferred visual manner for maximum impact, while also ensuring that the document content can be captured accurately by the parser, or other similar tool, with nothing discarded or misrepresented.

BRIEF DESCRIPTION OF THE DRAWINGS

The accompanying drawings, which are incorporated herein and form part of the specification, illustrate one or more aspects of the present invention and, together with the description, further serve to explain the principles of the invention and to enable a person skilled in the relevant art(s) to make and use the invention.

FIG. 2 illustrates a first example of a graphical element being encoded in accordance with a defined schema.

FIG. 4 illustrates a third example of a graphical element being encoded in accordance with a defined schema.

Figure 1:
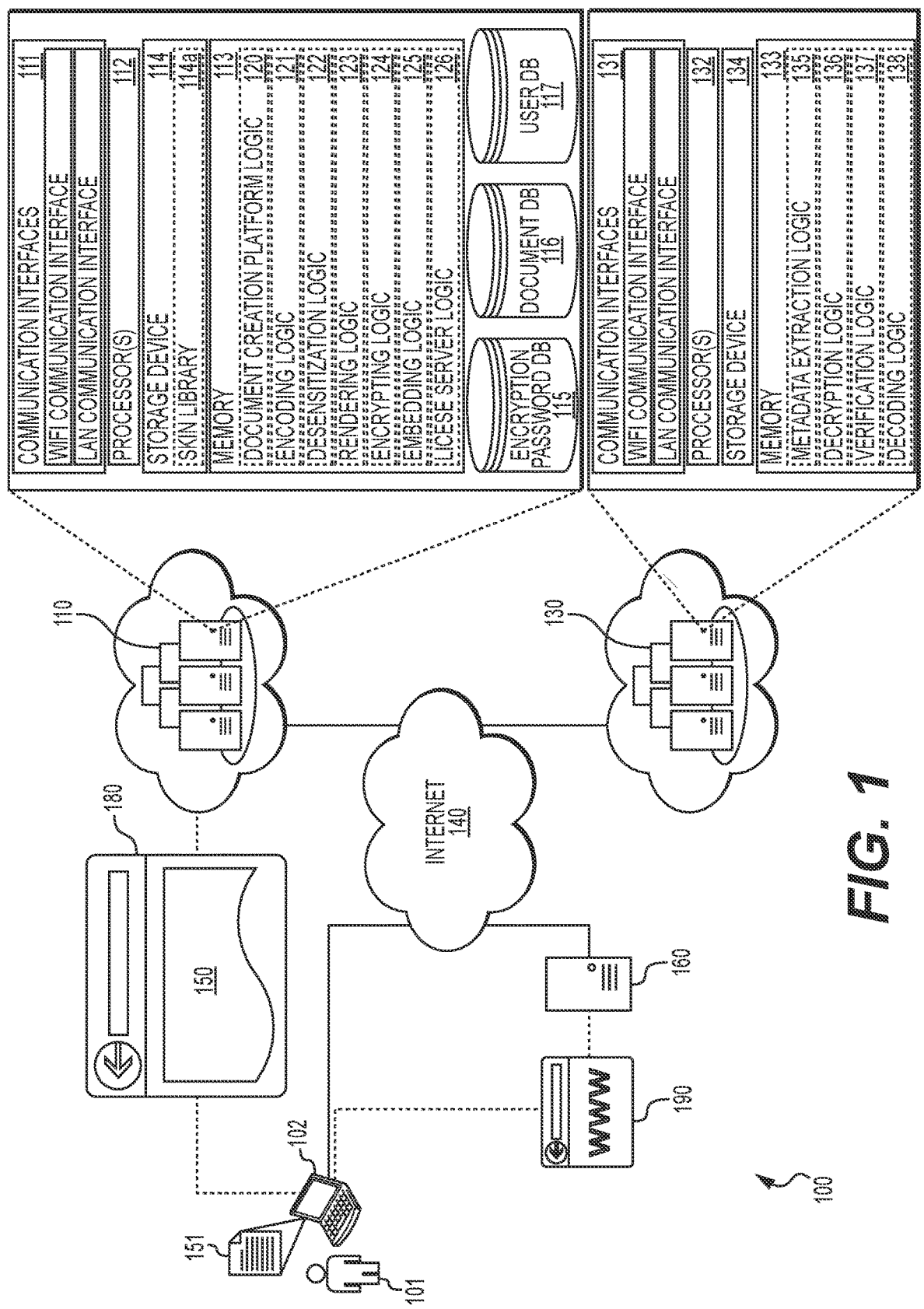
FIG. 1 illustrates an exemplary environment in which the document creation and document parsing techniques of the present invention may be used.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. Unless otherwise indicated, the drawings provided throughout the disclosure should not necessarily be interpreted as to-scale drawings.

DETAILED DESCRIPTION

FIG. 1 illustrates an exemplary environment 100 in which the present invention may be deployed. As illustrated, the environment 100 may include one or more users 101, each having a user device 102 (e.g., a personal computer, a cellular telephone, a PDA, or the like), which the users 101 may use to interact with enhanced document creation system 110 and document submission system 160. The enhanced document creation system 110 may host a document creation platform 180 that users 101 may interface with over the Internet 140 (e.g., using a web browser on user device 102) to create and format an initial document 150, view and update the document, and export the document as an enhanced document 151. By way of example, the enhanced document creation system 110 may host a resume creation platform (a la www.myperfectresume.com or www.zety.com) that users 101 may use to create, view, and update resumes, and export the resumes as enhanced resume documents. As another example, the enhanced document creation system 110 may host a tax filing preparation platform, through which a user 101 may be able to prepare their personal income tax returns.

The document creation platform 180, for instance, may allow users 101 to create an initial document 150 by presenting the user 101 with a fillable form, a wizard that prompts the user 101 for specific information, a WYSWIG editor, or the like. In response to a user request to export the initial document 150 in a particular file format (e.g., in Microsoft Word's DOCX format or Adobe Acrobat's PDF format), the enhanced document creation system 110 may export the initial document 150 as an enhanced document 151, namely by encoding the document content according to a defined schema and embedding the structured content as non-visible metadata in the enhanced document 151. The enhanced document creation system 110 may optionally encrypt the structured content prior to embedding it in the enhanced document 151. In some embodiments, the enhanced document creation system 110 may store the encoded (and optionally encrypted) content in a document database 116 in association with an exported document identifier. The exported document identifier may be embedded in the enhanced document 151 instead of (or in addition to) the encoded content itself, and may be later used to request the encoded content from the enhanced document creation system 110 (e.g., by enhanced document parsing system 130).

User 101 may then submit the enhanced document 151 to a document submission system 160. Document submission system 160, for example, may provide a document submission platform 190 that users 101 may interface with over the Internet 140 (e.g., using a web browser on user device 102) to upload and process the enhanced document 151 in a particular manner. By way of example, document submission system 160 may be a job application board, which may provide the user 101 with the ability to search through job postings and apply for a job by uploading a resume and other application materials (e.g., cover letter, references, etc.), which may then be processed through an ATS or other resume filtering system.

Document submission system 160 may call upon enhanced document parsing system 130 to extract and process the embedded metadata to completely and accurately parse the enhanced document 151, which document submission system 160 may utilize to further process the enhanced document 151. Enhanced document parsing system 130, for example, may provide a public or outward facing service (e.g., a SOAP or REST web service) that the document submission system 160 may invoke to parse an enhanced document 151. By way of example, the job application board may receive an enhanced resume uploaded by a user and send it to an enhanced resume parsing system 130 as part of a parsing request. The enhanced resume parsing system 130 may determine whether the resume is in fact an enhanced resume, and may extract and (if necessary) decrypt the embedded metadata, and return the encoded resume content that is extracted to the job application board. In some embodiments, the enhanced document parsing system 130 may further process the extracted content to place it in a form usable by the job application board (e.g., based on a mapping of some or all of the fields and elements of the defined schema to another schema used by the job application board). The job application board may use the structured data returned by the enhanced parsing system 130 to automatically complete one or more fields of a job application form for the user (e.g., based on a mapping of some or all of the elements and fields in the structured data to those of the application form). As another example, the document submission system 160 may be the tax filing preparation platform previously described, which may permit a user 101 to submit enhanced tax filing documents from previous years. The tax filing preparation platform may utilize an enhanced document parsing system 130 to extract and process the embedded metadata to completely and accurately extract the information contained in the enhanced tax filing documents. The tax filing preparation platform, in turn, may utilize this information to calculate and/or populate fields in a current filing being prepared by a user 101.

In embodiments where an exported document identifier is embedded in the enhanced document 151, the enhanced document parsing system 130 may extract the document identifier and request the associated encoded content from the enhanced document creation system 110. The enhanced document creation system 110, for example, may provide a public or outward facing service (e.g., a SOAP or REST web service) that the enhanced document parsing system 130 may invoke to request the encoded content (e.g., by passing the extracted document identifier). The enhanced document creation system 110 may return the requested content to the enhanced document parsing system 130, which may then pass the encoded content back to the document submission system 160 for further processing. As part of the request to the enhanced document creation system 110, the enhanced document parsing systems 130 may be able to specify the format in which the encoded content should be returned (e.g., a JSON, HTML, RTF, or TXT format). And, as before, the enhanced document parsing system 130 may further process the encoded content to place it in a form expected by the document submission system 160 (e.g., based on a mapping of some or all of the fields and elements of the defined schema to another schema used by the document submission system 160).

The enhanced document creation system 110 may also require the enhanced document parsing system 130 to authenticate itself as part of the request (e.g., by passing a unique license key associated with the enhanced document parsing system 130, or employing some other suitable authentication mechanism). The enhanced document creation system 110 may also look to verify that the enhanced document 151 has not been altered since it was initially exported to provide an additional layer of security and ensure that the encoded content returned to the enhanced document parsing system 130 is accurate. For example, an enhanced resume may be modified by a user after it has been exported, or may be repurposed by another individual, but may retain the exported document identifier as embedded metadata. In such cases, the encoded content associated with the exported document identifier would no longer correspond to the content of the enhanced document 151, and should not be returned to the enhanced document parsing system 130. In order to perform this verification, the enhanced document creation system 110 may require the enhanced document parsing system 130 to provide a hash value of the enhanced document 151 uploaded by the user as part of the request, which the enhanced document creation system 110 may then compare against a hash value of the encoded content stored in document database 116. If the hash values match, the enhanced document creation system 110 may return the encoded content to the enhanced document parsing system 130, but if they do not, a suitable error message may be sent instead. In alternative embodiments, the enhanced document parsing system 130 may provide the enhanced document 151 along with the request, and the enhanced document creation system 110 may be responsible for calculating the hash value for the enhanced document 151.

While the document submission system 160 and enhanced document parsing system 130 are illustrated as separate systems, this need not be the case, and the components and/or functionality of the document parsing system 130 may be integrated within the document submission system 160 itself. The logic components of the document parsing system 130 described below, for example, may be provided on the document submission system 160 (e.g., as executable libraries usable by the document submission system 160). In some embodiments, the document submission system 160 may provide a widget as part of the document submission platform 190 (e.g., installed on a job application form) through which a user 101 would be able to directly submit an enhanced document 151 to be perfectly parsed (i.e., with the widget operating as the enhanced document parsing system 130). The user 101 may have one or more options by which it can submit or otherwise provide the enhanced document 151 to the document submission system 160 through the widget. The user 101, for example, may be able to upload a previously exported enhanced document 151 through the widget.

In some embodiments, the widget may look to see whether the user has a relationship with the enhanced document creation system 110 or document creation platform 180, and may allow a user to select an enhanced document 151 to submit directly there from. The user 101, for example, may be able to retrieve the enhanced document 151 directly from the enhanced document creation system 110 (e.g., through a public or outward facing REST or SOAP service). In cases where the user 101 has created multiple enhanced documents 151 through the document creation platform 180, the user 101 may be prompted to select which document they would like to submit. Conversely, if the user 101 has not yet created an enhanced document 151, the user 101 may be redirected to document creation platform 180 in order to do so.

In some cases, the widget may require the user to authenticate themselves in order to submit or otherwise provide the enhanced document 151 to the document submission system 160. The widget, for example, may detect the presence of a cookie, indicating that the user 101 is signed into the document creation platform 180, and may prompt the user 101 to confirm whether they wished to submit an enhanced document 151. In this way, a user 101 is able to control whether the enhanced document 151 is provided to the document submission system 160, and the enhanced document creation system 110 may track and facilitate the use of enhanced documents 151. If no such cookie is detected, the user 101 may be prompted to sign into the document creation platform 180 before being allowed to proceed. In other embodiments, the widget may ask the user to delegate to the document submission system 160 ongoing access (e.g., via OAuth or a similar access delegation protocol) to the enhanced document 151 from the document creation system 110. In this way, the user 101 can, for example, grant the document submission system 160 the ability to check for newer versions of the enhanced document 151 in the future, receive notifications of subsequent document revisions, or receive other relevant information regarding the user 101 and/or the enhanced document (e.g., allowing the document submission system 160 to the check on the user's job search status, availability for an interview, etc.). The document creation platform 180 may also require the document submission system 160 to authenticate itself (e.g., using a previously provided license key or a similar authentication mechanism) before the enhanced document 151 is communicated, providing another layer of security to the exchange of the users information.

Once the user has uploaded, chosen, or created the enhanced document 151 they would like to submit to the document submission system 160, the widget may extract the encoded content embedded therein. In instances where the user 101 has chosen to retrieve the enhanced document 151 directly from the enhanced document creation system 110, the enhanced document creation system 110 may simply return the encoded content itself. The widget, in turn, may map one or more fields within the encoded content to corresponding fields in the document submission platform 190 (e.g., to corresponding fields in the job application form).

The enhanced document creation system 110 may include one or more communication interfaces 111 (e.g., a WiFi communication interface or a LAN interface), one or more processors 112, a memory 113, a storage device 114, which may contain a skin library 114a, and one or more databases, including a user database 117, an encryption password database 115, and document database 116. The memory 113 may include document creation platform logic 120, encoding logic 121, desensitization logic 122, rendering logic 123, encrypting logic 124, embedding logic 125, and license server logic 126, which processor(s) 112 may utilize to provide the system functionality described below.

Document creation platform logic 120, for instance, may allow the enhanced document creation system 110 to provide a document creation platform 180 through which a user 101 may create an initial document 150. The enhanced document creation system 110, for example, may utilize document creation platform logic 120 to present a website or portal to the user 101 with fillable form elements or fields that a user 101 may fill out, select, or otherwise complete. For example, document creation platform logic 120 may present the user with a resume building tool, which may prompt a user to select a resume template, or may select a resume template automatically based on one or more attributes of the user 101, which may be stored in user database 117 (e.g., as part of a user profile).

Based on the selected template, the document creation platform logic 120 may then generate a resume form, with one or more empty sections having one or more fields or other form elements for the user 101 to complete. The sections, for example, may be directed toward the user's personal identification information, educational background, job experience, or the like. As another example, the document creation platform 180 may present the user 101 with a list of sections that a user 101 may select to include in the initial document 150. Through the document creation platform 180, user 101 may choose a section or paragraph to edit, and may be presented with a text entry form for that section or paragraph. User 101 may then modify the text and adjust formatting inputs (e.g., positioning, style, etc.) for the section. In some instances, the resume form may be dynamic in nature, for example, allowing a user to add or remove sections (e.g., for each college or university attended, or each job they have held).

Figure 3:
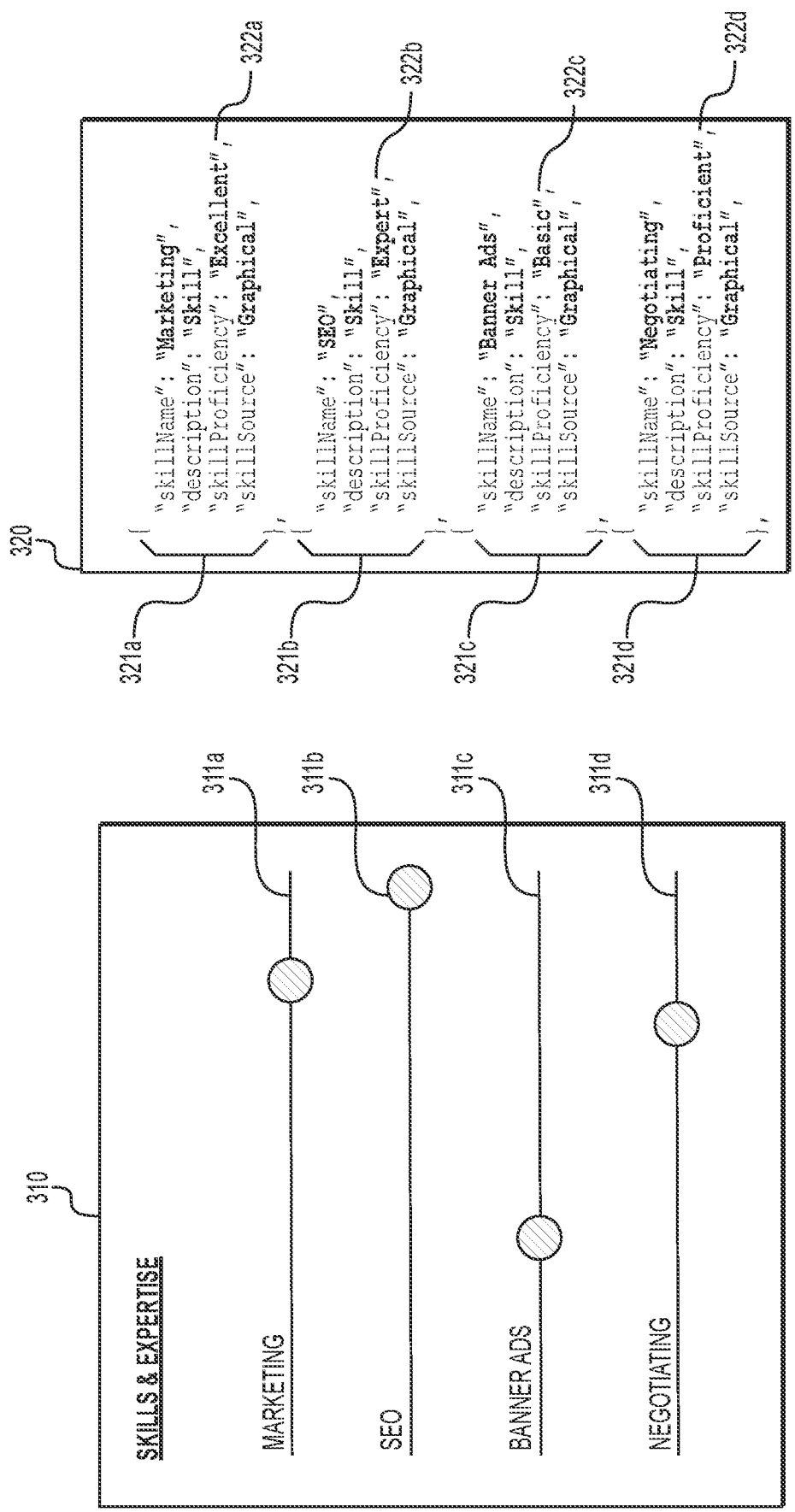
FIG. 3 illustrates a second example of a graphical element being encoded in accordance with a defined schema.

The document creation platform 180 may also allow the user 101 to include one or more graphical elements in the initial document 150. A user 101, for example, may be asked to upload a profile picture to be included in the initial document 150, or the graphical element may be generated by document creation platform logic 120 in response to one or more user inputs provided through the document creation platform 180. For example, as depicted in FIG. 3, a resume building tool may present a user 101 with a number of slider controls corresponding to particular skills the user 101 may have, which the user 101 may adjust based on their level of proficiency. As another example, depicted in FIG. 4, resume building tool may prompt a user about particular skills or hobbies that they may have, and may be presented with icons, emojis, monograms, images, gifs, or other graphics that represent these skills, hobbies, or other attributes, which a user may then select to place in their resume. The selected graphic may include a corresponding description, which the user 101 may be able to change. In other instances, the resume building tool may allow a user 101 to upload their own image or graphical element, and as part of the upload process, may prompt the user to provide a description and/or identify a skill, hobby, or other attribute with which it is associated.

In some embodiments, the document creation platform 180 may provide the user with the ability to save the initial document 150 in a particular state in document database 116, and may utilize document encoding logic 121 in order to do so. In such cases, the document creation platform 180 may allow the user 101 to restore a previously saved document to view, export or further modify. The document creation platform 180 may also allow the user 101 to provide an existing un-enhanced document, which the enhanced document creation system 110 may parse using parsing software. The information extracted by parsing the document may be analyzed by document creation platform logic 120 to identify the presence of one or more sections, and to seed or pre-populate the fillable form elements of the initial document 150 corresponding to the identified sections. The initial document 150 may then be encoded as structured data and embedded into an enhanced document 151 using document encoding logic 121 as discussed below. User 101 may also be able to edit the pre-populated document content prior to it be encoded and embedded into an enhanced document 151, for example, to correct any errors or omissions resulting from the automated parsing of an un-enhanced document.

Document encoding logic 121, in turn, may be used to encode the initial document 150 as structured data according to a defined schema (e.g., a proprietary or standardized XML or JSON schema) based on a known semantic meaning of each form element, and by association, the content therein. Document encoding logic 121, for instance, may map each section or paragraph of the resume completed by the user 101 to specific elements and fields within the defined schema. By way of example, a work history section of a resume may contain a record of a user's employment, with a paragraph or sub-section corresponding to each position the user 101 has held. Each position may further contain elements corresponding to the name of the employer, the dates of employment, and description of experience. Based on the semantic meaning of each element (e.g., as falling within a work history section or calling for an employer name) document encoding logic 121 may be able to encode the content entered by the user as structured data according to a structured schema.

Document encoding logic 121 may store the encoded document in document database 116. In some embodiments, document encoding logic 121 may encode and store the initial document 150 based on a user input provided through the document creation platform 180 (e.g., by clicking a save button). While in others, document encoding logic 121 may encode and store each form element of the initial document 150 in real-time, as completed by the user (e.g., when a form element goes out of focus). In this way, the document creation platform 180 may maintain a state of the initial document 150, and allow the user 101 to update and revise the document over multiple sessions. The encoded document may be stored in document database 116 in association with a document identifier, which may serve as a version identifier for particular instances of the encoded document.

Figure 5:
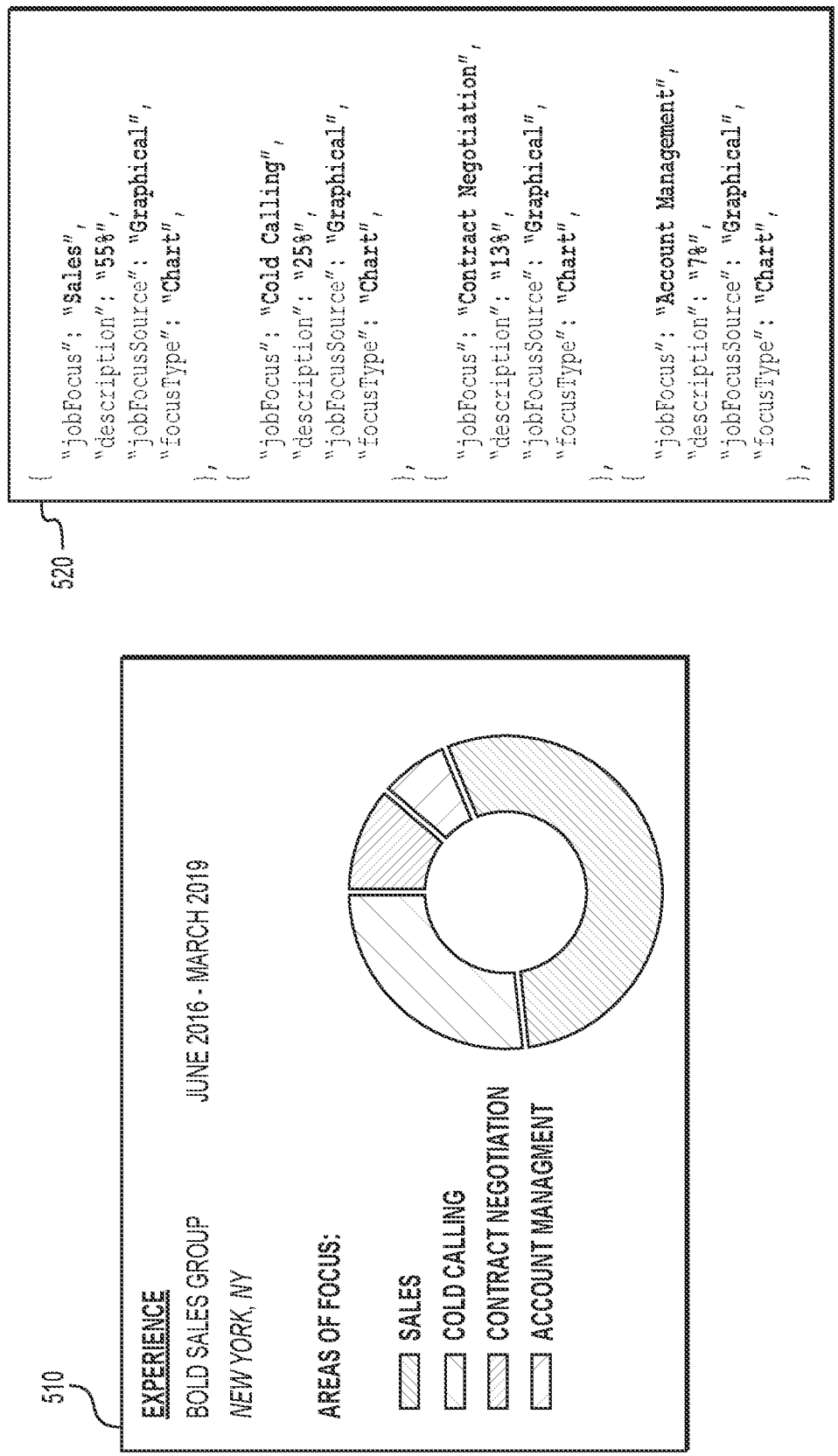
FIG. 5 illustrates a fourth example of a graphical element being encoded in accordance with a defined schema.

In instances where the initial document 150 includes a graphical element—which are typically difficult for traditional parsers to interpret and frequently disregarded by such parsers—the document encoding logic 121 may map a visual indicator in the graphical element to a value of a field within the defined schema. FIG. 2, for example, illustrates a graphical element 210 illustrating the user's level of proficiency in various design skills that a user 101 may include in a resume, which may be generated by the document creation platform 180 in response to a set of questions or prompts presented to the user 101 regarding their design abilities. The enhanced document creation system 110, in turn, may encode the graphical element 210 as structured data 220. FIG. 5, similarly, illustrates a graphical element 510 that represents the various roles that a user 101 performed in a previous job, which the enhanced document creation system 110 may encode as structured data 520.

As another example, FIG. 3 illustrates a graphical element 310, consisting of a series of slider controls 311-314 that a user may adjust to reflect their level of skill or expertise with particular subject matter. As illustrated, document encoding logic 121 may encode the graphical element 310 as structured data 320, with the value of each slider control 311*a*-311*d* being reflected in the "skillProficiency" field 322*a*-322*d* in a corresponding slider control element 321*a*-321*d* of the encoded document. FIG. 4 illustrates another example in which a graphical element 410 may be selected by a user from a list of graphical elements 401 provided to the user in response to a prompt regarding the user's skills 402. The graphical element may have an associated description 411, which may be provided or modified by the user 101 through the selection process. Upon export as an enhanced document 451, only the graphical element will be visible, but additional information associated with the graphical element, such as its description, may nevertheless be encoded as structured data 420 and embedded therein. In some cases, the schema may provide that the graphical element itself also be included in the structured data (e.g., as a byte string, or referentially to a location of the graphical element in the visible portion of the enhanced document). A user's profile picture, for example, may be encoded in the structured data as a graphical element having a description field, which may take the value 'profile picture,' and a base64 representation field, which may contain a byte string representation of the image.

In some embodiments, the document encoding logic 121 may also augment the encoded content based on the semantic meaning of individual document elements. By way of example, a resume created using the previously described resume creation tool may indicate that the job seeker has significant experience as a cashier. In order to improve the chances that the resume is not dismissed by any software filters (e.g., those applied by an ATS) and presented to a human reviewer, document encoding logic 121 may additionally characterize the experience as "money handling" or "customer relations" in the encoded document. Augmenting the enhanced document 151 in this way may also help to provide an enhanced or improved matching experience (e.g., for an employer looking for qualified job seekers), as the augmented information may make the document more likely to appear in response to a particular document search or query (e.g., of a resume database or the like). These additional descriptors may not be visibly rendered in the enhanced document 151, but will persist in the encoded content embedded therein.

In other embodiments, the enhanced document creation system 110 may allow users 101 to designate content within the initial document 150 as being non-visible, redacted or otherwise hidden. By way of example, an actively employed job seeker may not want their current employer to know they are looking for new opportunities, and may be reluctant to distribute their resume as a result. A user 101 may be able to redact or hide certain information (e.g., their personal identification information, the name of their current employer, references, or any other information they would like to protect) such that it is not visible on the resume, while still including it as encoded content embedded therein. In some instances, the document creation system 110 may include a flag or parameter in the enhanced document 151 indicating that user approval was obtained for embedding information within the enhanced document 151 and/or allowing for processing of the embedding information, for example, through the terms of service or an opt-in prompt presented to the user 101 through the enhance document creation platform 180. Moreover, as discussed below, the enhanced document 151 may be provided with methods of interaction through which feedback may be provided regarding the enhanced document 151. In this case, the enhanced document 151 may allow a recruiter or hiring entity to request access to view such information, which may be directly or indirectly communicated to the user 101 of the enhanced document 151 for approval.

In yet other embodiments, the enhanced document creation system 110 may separately prompt the user 101 to provide additional content beyond the initial document 150, which document encoding logic 121 may include as encoded content. In this way, the enhanced document 151 may carry additional information suitable for extraction by the enhanced document parsing system 130 while maintaining the visual appearance of the initial document 150 when rendered. For instance, users 101 will typically try to limit the length of their resume to one page, but this often requires omission of potentially relevant information, like secondary skills or prior job experience, which may ultimately hurt a job seekers chances of being found and hired. As another example, the enhanced document creation system 110 may include alternative versions of the content in different languages.

In yet other embodiments, the enhanced document creation system 110 may automatically select what content in the initial document 150 will be visible and/or included as encoded content. For example, a user 101 may be able to provide a job description, or a URL to a particular job application, which enhanced document creation system 110 may analyze to determine what content in the initial document 150 is most relevant, to be visibly rendered, with document encoding logic 121 including all, some, or none of the remaining content as encoded content.

In some cases, the enhanced document creation system 110 may automatically include related information as encoded content that may aid or assist in processing the enhanced document 151. By way of example, job applicants are frequently asked to provide basic bibliographic information (e.g., mailing address, work authorization status, etc.) or to submit a cover letter along with their resume. Repeatedly entering this information when applying for multiple jobs can be a laborious and monotonous task, frequently dissuading a job seeker from completing a job application. Such information, which may have been previously captured (e.g., during a registration process, or when completing a different job application) and stored as part of a user profile in user database 117, can instead be included as encoded content within the enhanced document 151, allowing an enhanced document parsing system 130 to automatically extract this information and provide the information to document submission system 160 to streamline the application process for the job seeker. As another example, where the enhanced document 151 may be an order procurement or fulfillment form used by a business, the enhanced document creation system 110 may be able to include related invoices, delivery forms, and receipts (e.g., containing itemized breakdowns of the order, along with associated costs and shipping information) as encoded content.

Figure 6:
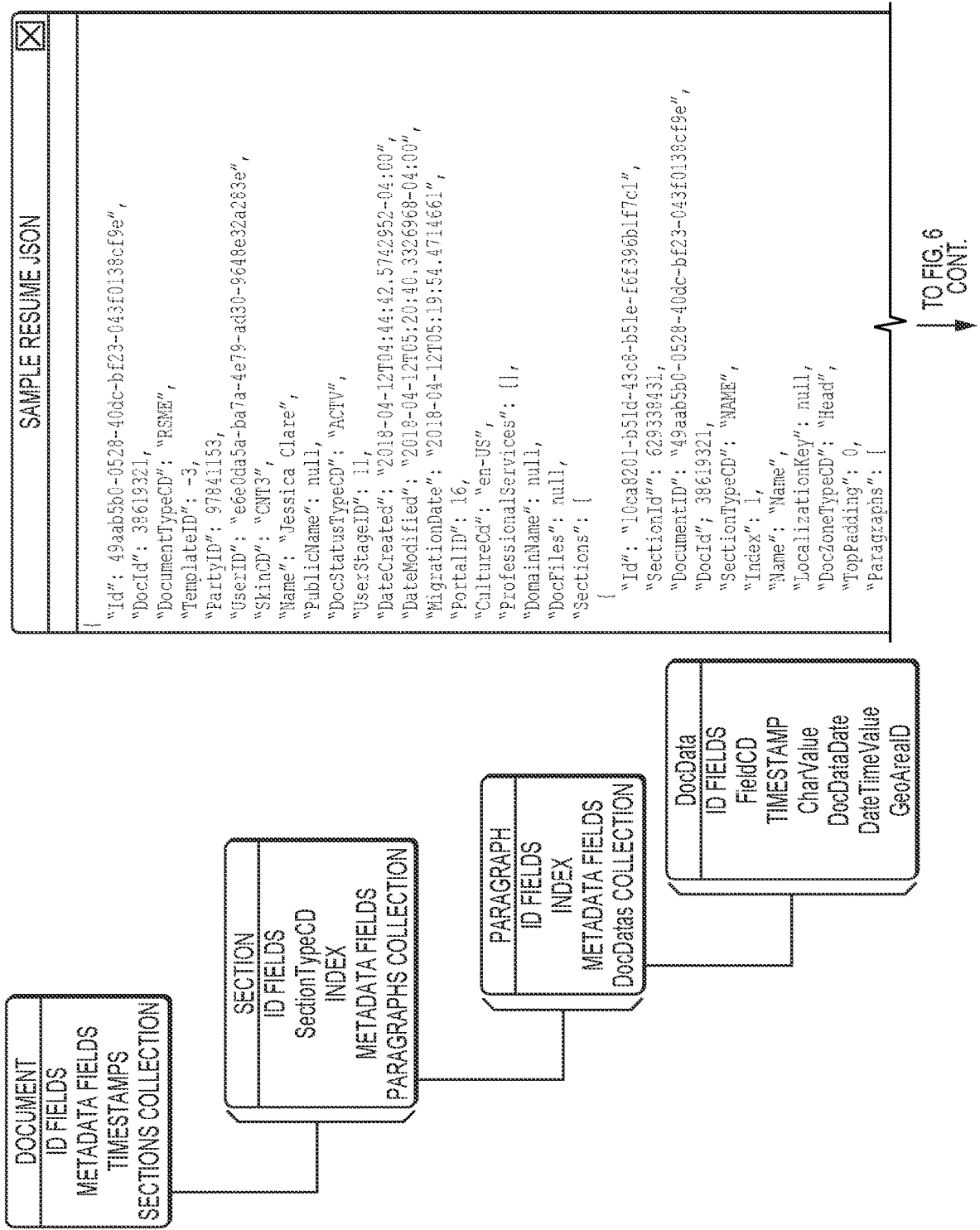
FIG. 6 illustrates a high-level view of an exemplary schema that the enhanced document creation system may employ to encode an initial document.

FIG. 6 provides a high-level view of a proprietary schema that the enhanced document creation system 110 may employ to encode an initial document 150. As illustrated, the proprietary schema may provide a hierarchical encoding structure, where a document may be broken down into document, section, paragraph, and document data elements, each element having specific fields. Because enhanced document parsing systems 130 may be implemented or deployed by different entities, a customized mapping of the proprietary schema for the particular instance or implementation may be necessary. In order to reduce or eliminate the amount of customization necessary and allow the parsing enhancements to be available to a wider number of enhanced document parsing systems 130, some embodiments may make use of an open standard. In such cases, document encoding logic 121 may translate data encoded according to a proprietary schema used by document creation platform 180 into an open standard schema. The enhanced document creation system 110, for example, may translate data encoded in accordance with the schema illustrated in FIG. 6 into the HR-JSON or HR-XML schemas promulgated by the HR Open Standards Consortium. However, such standardized schemas may not natively accommodate the full set of elements and values that may be defined in a proprietary schema, and may be extended in order to accommodate additional structure, functionality, or behavior.

Desensitization logic 122 may allow the enhanced document creation system 110 to desensitize an encoded document so as to ensure that no sensitive user information (e.g., SSN, photograph, personal identification information, etc.) is included in the enhanced document 151. The desensitization logic 122, for example, may process an encoded document (i.e., after the initial document 150 has been encoded and stored in document database 116) and mark any sensitive user information to be excluded from translation to the open standard schema, if such a translation takes place, and/or to be excluded prior to rendering the encoded document.

Rendering logic 123 may allow the enhanced document creation system 110 to render an encoded document (or desensitized or translated document, as the case may be) in a particular file format (e.g., Microsoft Word's DOCX format or Adobe Acrobat's PDF format), which in some embodiments, may be specified by a user 101. The rendering logic 123, for example, may be used to generate an intermediate file from the encoded content, where the visual appearance of the document content (i.e., the positioning and style of the document content) may be provided by a skin definition associated with initial document 150, which may be stored and retrieved from skin library 114a. The enhanced document creation system 110, for example, may generate an HTML file comprising different HTML elements, with specified CSS styles, along with a linked CSS stylesheet to control the position and style (i.e., the visual appearance) of the document content. The enhanced document creation system 110 may then convert the intermediate file into a particular file format, like Microsoft Word's DOCX format or Adobe Acrobat's PDF format. In doing so, the enhanced document creation system 110 may make use of publicly available conversion libraries, like Aspose (for HTML to DOCX conversion) or ABCpdf (for HTML to PDF conversion).

In some embodiments, the rendering logic 123 may allow the enhanced document creation system 110 to include one or more methods of interaction (e.g., in the form of interactive buttons, hyperlinks, or the like) through which feedback may be provided regarding the enhanced document 151. By way of example, once a job seeker submits a job application, they are left waiting for a response from the hiring entity. This response may never come, and the user 101 may worry that the resume never reached a human reviewer (e.g., if it was not properly parsed). By providing interactive buttons or other methods of interaction within the resume itself, a human reviewer may be able to quickly and automatically take action, for example, notifying the user 101 that their resume had been reviewed and/or whether they were being considered for the job, automatically reaching out to the user 101 to schedule an interview or request references, or the like. The provided methods of interaction may also be able to make use of content embedded within the document by embedding logic 125. For example, the enhanced document 151 may provide a mechanism whereby a human reviewer may determine whether an updated version of the enhanced document 151 is available and request the updated version if so (e.g., by invoking a public facing API and passing an encryption key or exported document identifier embedded within the enhanced document 151).

The enhanced document creation system 110 may additionally, or alternatively, provide an interface (e.g., in the form of a public or outwardly facing REST or SOAP service) through which feedback can be provided regarding an enhanced document 151. For example, through the interface, the document submission system 160 and/or enhanced document parsing system 130 may be able to update the enhanced document creation system 110 as to the processing status (e.g., received, processed, approved/rejected, or other custom status) of the enhanced document 151 (e.g., by passing a status indicator, an encryption key or exported document identifier, and a licensing key if required to the API). The enhanced document creation system 110 may also provide an interface through which a user 101 may receive and respond to feedback regarding an enhanced document 151. In this way, the enhanced document creation system 110 may allow for bidirectional communication between a user 101 and the document submission system 160 and/or the entity that operates it.

Encryption logic 124 may allow the enhanced document creation system 110 to generate an encryption key (e.g., by using an encryption key generation algorithm like PBKDF2), which may be used to encrypt the encoded document (e.g., using an encryption algorithm like AES) to create an encrypted byte string of the encoded content. In embodiments where the encoded document is desensitized and/or translated, the encryption logic 124 may encrypt the desensitized and/or translated content. The encryption key that is generated may make use of an encryption password, which may be stored and retrieved from encryption password database 115, as well as randomly generated salt or initialization vectors. In embodiments where the enhanced document creation system 110 acts as an encryption licensing server, the encryption key that is generated may be assigned a unique encryption key identifier, and stored in encryption password database 115 in association with the initial document 150, which similarly may be assigned a unique document identifier. The enhanced document creation system 110 may generate a new encryption key each time the initial document 150 is exported as an enhanced document 151 (e.g., as the user updates or modifies the initial document 150). In this way, the encryption key identifier may also act as a version identifier, identifying each version of the initial document 150 exported. In some embodiments, the enhanced document creation system 110 may store the encoded document (or desensitized or translated document) at the time of export in association with an exported document identifier in document database 116. In this way, the enhanced document creation system 110 may maintain each version of the initial document 150 that has been exported.

Embedding logic 125, in turn, may allow the enhanced document creation system 110 to embed the encoded, and optionally encrypted, content into a rendered document as non-visible metadata. The embedding logic 125, for example, may prepend any salt or initialization vectors that were used to generate the key to the beginning of the encrypted byte string. Alternatively, in embodiments where the enhanced document creation system 110 acts as an encryption licensing server, the embedding logic 125 may prepend the encryption key identifier associated with the encryption key that was generated. The modified byte string may then be written into the converted document as non-visible metadata (e.g., into the "Custom Properties" of a Microsoft Word DOCX or Adobe Acrobat PDF file). In embodiments where the enhanced document creation 110 stores the encoded document upon export, the embedding logic 125 may additionally, or alternatively, embed the exported document identifier associated with the encoded document that was exported. While the foregoing describes the embedding of encrypted content, it should be appreciated that the encoded content need not be encrypted and can be embedded as an unencrypted byte string.

Some file formats may place limitations on the form in which the non-visible metadata may be written to the converted document, for example, requiring ID-value pairs or limiting the size or length of the value (e.g., to strings of less than 255 characters in length, etc.). Embedding logic 125 may allow the enhanced document creation system 110 to determine the file format of the converted document, and manipulate the byte string so as to conform with any limitations the format may place on non-visible metadata stored therein.

In some embodiments, the embedding logic 125 may allow the enhanced document creation system 110 to embed custom code or macros to perform certain functionality. The enhanced document creation system 110, for example, may create a macro that would generate an alert message when the user 101 was about to modify the enhanced document 151, which would warn the user 101 that any changes made outside of the document creation platform 180 may result in imperfect parsing of the document. In some cases, the enhanced document creation system 110 may prevent the user 101 from making any changes. In other embodiments, the enhanced document creation system 110 may embed a macro within the enhanced document 151 that would allow changes made in the visual appearance of the document to be synchronized with the embedded content contained therein. The macro, for example, may transmit the updated content to the enhanced document creation system 110 (e.g., via an API or web service), which may perform the encoding process to generate updated encoded content, which may be optionally encrypted and embedded back into the enhanced document 151.

License server logic 126 may allow the enhanced document creation system 110 to act as a licensing server, allowing the enhanced document creation system 110 to control whether an enhanced document parsing system 130 is able to (i.e., licensed to) extract and/or decrypt the non-visible metadata embedded in an enhanced document 151 of a user 101. By limiting the ability to extract and/or decrypt the embedded content, which may include sensitive user information (in embodiments where desensitization is not performed) or other personal details that would not otherwise be visible to a human reader, the enhanced document creation system 110 is able to safeguard the user's information even after it has been exported, only allowing authorized parsers to obtain the content. License server logic 126 may also allow the enhanced document creation system 110 to expire encryption keys and exported document identifiers, which effectively operates to expire the embedded content. In this way, the enhanced document creation system 110 is able to prevent the extraction and use of user information that may no longer be accurate (e.g., if a user's contact information has changed, or if an error in the document was corrected).

The license server logic 126 may provide the enhanced document creation system 110 with the ability to create unique license keys for a particular parsing entity, or a particular application of the parsing entity, which the parsing entity may be required to submit along with any request. The license server logic 126 may also allow the enhanced document creation system 110 to limit use of the license key to particular systems (e.g., based on a domain, IP address subnet, or the like), limit use of the license key to a particular rate or volume of requests (e.g., max daily or hourly volume, or a global maximum volume). The license server logic 126 may allow the enhanced document creation system 110 to delete, deactivate and/or activate a license key. By deactivating the key it may no longer be authorized for use, but may still be maintained within the system, for example, for audit trail purposes.

The enhanced document creation system 110 may provide an outward facing service (e.g., a SOAP or REST web service) that an enhanced document parsing system 130, having an authorized license key, may invoke to request an encryption key corresponding to a particular encryption identifier. Upon successful verification of the license key, which may involve checking to see if the license key exists, is currently active, and that no access limits have been exceeded, the enhanced document creation system 110 may retrieve the encryption key from encryption password database 115 based on the requested encryption identifier and return it to the enhanced document parsing system 130 that made the request. In embodiments where the enhanced document creation 110 stores the encoded document upon export, the enhanced document parsing system 130 may be able to invoke the service to request the encoded content itself (e.g., by providing the encryption key identifier or exported document identifier associated with the encoded document that was exported along with a valid license key). The license server logic 126 may also allow the enhanced document creation system 110 to expire or delete an encryption key or encoded content based on the encryption key identifier or associated document identifier, for example, in response to a user request to expire a specific enhanced document 151 exported from the enhanced document creation system 110.

In some embodiments, the enhanced document creation system 110 may permit document submission systems 160 and/or enhanced document parsing systems 130 to register an enhanced document 151 with the enhanced document creation system 110 (e.g., by registering a notification URL through a public facing API), such that the enhanced document creation system 110 may automatically notify document submission systems 160 and/or enhanced document parsing systems 130 when user 101 updates or otherwise changes the initial document 150 and exports the document as an updated enhanced document 151. In other embodiments, the document submission systems 160 and/or enhanced document parsing systems 130 may be able to query the enhanced document creation system 110 (e.g., by invoking a public facing API and passing an encryption key or exported document identifier), to see whether an updated version of the enhanced document 151 is available or to request the encoded content of the enhanced document 151 in an alternate format (e.g., in an HTML, RTF, or TXT format), which it may be able to better process.

The enhanced document creation system 110 may also receive notifications (or other feedback) from the document submission systems 160 and/or enhanced document parsing systems 130 regarding a status of an enhanced document 151. For example, the document submission systems 160 and/or enhanced document parsing systems 130 may provide the enhanced document creation system 110 with a notification that an enhanced document 151 was received and successfully parsed, a notification that an error occurred when attempting to parse the enhanced document 151 or that the document was corrupted in some manner, or some other notification regarding the document status (e.g., by triggering a notification URL included within the embedded content of the enhanced document 151 or invoking a public facing API provided by the enhanced document creation system 110). The document submission systems 160 and/or enhanced document parsing systems 130 may provide additional contextual information along with the notification. For example, where a user 101 submits a resume through a job application board, the notification may not only indicate the status of the resume (e.g., as being received, successfully parsed, or under review) but also provide additional details regarding the submission (e.g., identifying a company or role for which the resume was submitted). The enhanced document creation system 110 may also take one or more actions in response to receiving a notification. For example, a user 101 may be automatically notified if an error occurred preventing the enhanced document 151 from being parsed, allowing the user 101 to resubmit the enhanced document 151 or take other corrective action. As another example, the enhanced document creation system 110 may modify or update the document identifier of the enhanced document 151 to be associated with the document submission systems 160 and/or enhanced document parsing systems 130 from which the status notification was received.

The enhanced document parsing system 130 may include one or more communication interfaces 131 (e.g., a WiFi communication interface or a LAN interface), one or more processors 132, a memory 133, and a storage device 134. The memory 133 may include metadata extraction logic 135, decryption logic 136, verification logic 137, and decoding logic 138, which processor(s) 132 may utilize to provide the system functionality described below.

Metadata extraction logic 135 may allow the enhanced document parsing system 130 to extract metadata embedded within an enhanced document 151. The enhanced document parsing system 130, for example, may extract the embedded metadata from the enhanced document 151 to obtain a single extracted byte string. In instances where the embedded content is encrypted, the enhanced document parsing system 130 may split the extracted byte string into a salt and initialization vector, and encrypted content. Where the metadata consists of a series of ID-value pairs, enhanced document parsing system 130 may first concatenate the values in sequence (e.g., based on the IDs) to form the single extracted byte string. Alternatively, in embodiments where the enhanced document creation system 110 acts as an encryption licensing server, the enhanced document parsing system 130 may split the byte string into an encryption key identifier and encrypted encoded content.

In instances where an exported document identifier was embedded in the enhanced document 151, the metadata extraction logic 135 may contact the enhanced document creation system 110 to request the encoded content (i.e., associated with the exported document identifier) that was initially stored by the document creation system 110 when the document was exported. The enhanced document parsing system 130, for example, may be able to query the enhanced document creation system 110 by invoking a public facing API and passing the exported document identifier along with other request parameters. The request, for example, may indicate the desired format in which encoded content should be returned and/or include a license key authorizing the enhanced document parsing system 130. In some embodiments, the enhanced document parsing system 130 may also indicate the scope of content being requested, for example, indicating whether or not the enhanced document creation system 110 should return augmented content, hidden user content, or supplemental content, as discussed above.

The enhanced document parsing system 130 may attempt to extract embedded metadata from a received document automatically, under the assumption that it is an enhanced document 151, or it may first detect whether a received document is an enhanced document 151, for example, based on an indicator (e.g., a keyword or phrase, symbol, graphic, or the like) provided in the visible portion of the document. In some instances, the indicator while appearing in the visible portion of the document may nevertheless be hidden or obfuscated from identification and inspection by a human reviewer (e.g., by using a small font size, and/or transparent or low-contrast color). The enhanced document parsing system 130 may also determine whether the extracted byte string the encoded content itself or an exported document identifier and may process the extracted metadata accordingly. The enhanced document parsing system 130 may also determine whether the encoded content is encrypted and may process the data accordingly.

Decryption logic 136 may allow the enhanced document parsing system 130 to decrypt the encrypted content once extracted or returned by the enhanced document creation system 110. The enhanced document parsing system 130, for example, may regenerate the encryption key using an encryption password obtained from the enhanced document creation system 110, and the salt and initialization vectors extracted from the metadata of the enhanced document 151. Alternatively, in embodiments where the enhanced document creation system 110 acts as an encryption licensing server, the enhanced document parsing system 130 may submit a request including a license key and the encryption identifier extracted from the document metadata properties to the enhanced document creation system 110, which may return the encryption key requested. The regenerated or returned encryption key may then be used by the enhanced document parsing system 130 to decrypt the encrypted encoded content.

Verification logic 137 may allow the enhanced document parsing system 130 to determine whether the visible content of the enhanced document 151 has been modified since its creation, in which case the encoded content may no longer be accurate. In such cases, the enhanced document parsing system 130 may revert back to traditional parsing methods. The enhanced document parsing system 130, for example, may extract all text characters in the visible content of the enhanced document 151, as well as all text characters in each element in the encoded content, into separate strings. The text characters may be extracted in their exact order of appearance and may include whitespace. The enhanced document parsing system 130 may then compute a hash value for each string (e.g., using the MD5 hashing algorithm), and compare the two values together to determine whether any differences exist.

In cases where an exported document identifier is embedded in the enhanced document 151 and the associated encoded content is requested from the enhanced document creation system 110, the enhanced document parsing system 130 may transmit the hash value for the enhanced document 151 to the enhanced document creation system 110 as part of its request. The enhanced document creation system 110 may compute a hash value of the associated encoded content stored in document database 116 as just described, and compare the received hash value to the computed hash value to determine whether the enhanced document 151 has been altered since its export. If the hash values do not match, the enhanced document creation system 110 may respond with an error message, and the enhanced document parsing system 130 may revert back to traditional parsing methods.

Decoding logic 138, in turn, may allow the enhanced document parsing system 130 to decode the extracted and optionally decrypted content, and may provide the resulting structured data to document submission system 160 as needed. In some cases, the enhanced document parsing system 130 may process the extracted content in order to place it in a form expected by a document submission system 160 (e.g., based on a mapping of some or all of the fields and elements of the defined schema to another schema used by the document submission system 160).

Figure 7:
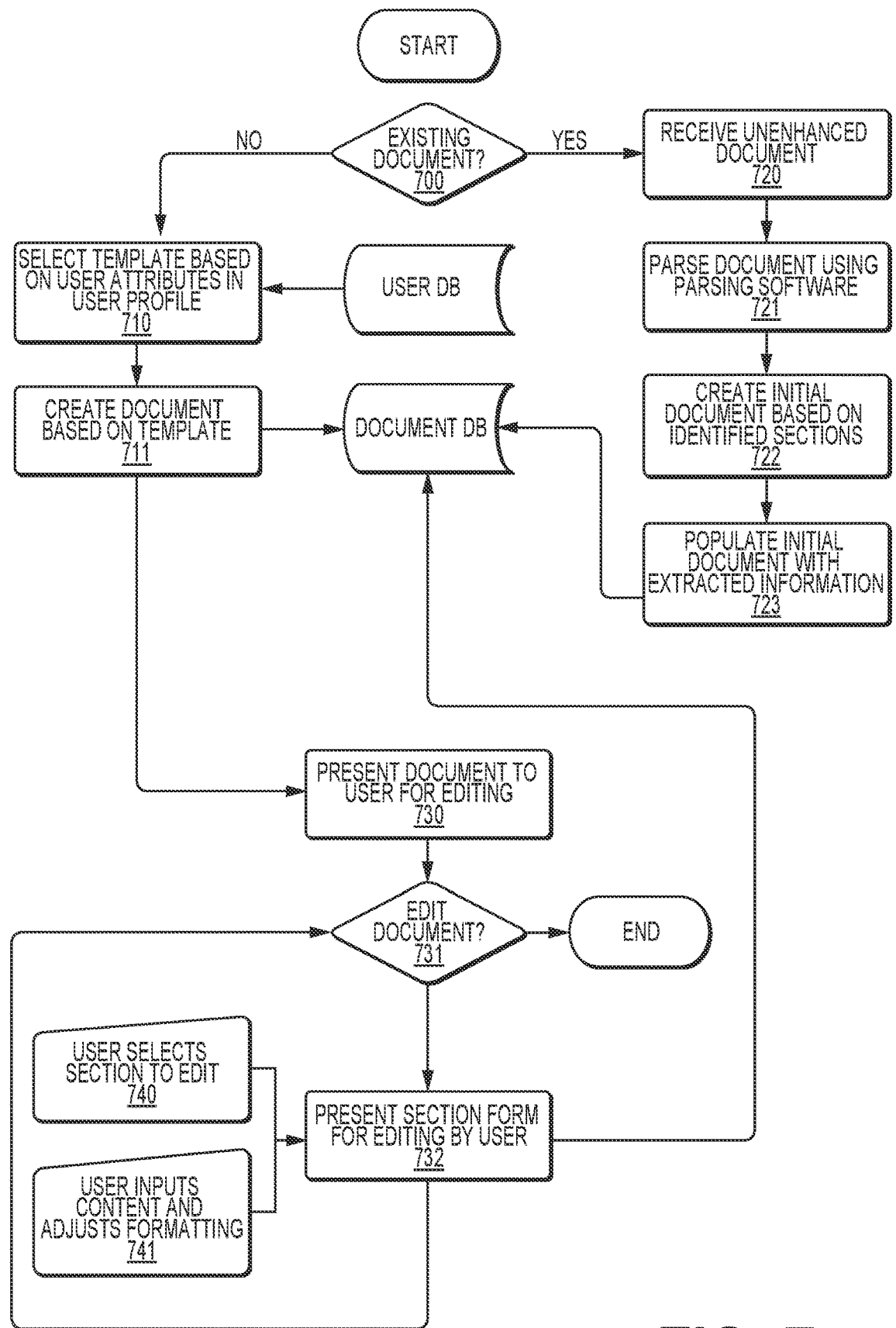
FIG. 7 depicts a high-level logic flow that the enhanced document creation system may employ in creating an initial document.

FIG. 7 depicts a high-level logic flow that the enhanced document creation system 110 may employ in creating an initial document 150. The process may begin with a determination of whether the user 101 would like to create a new document or work from an existing document, for example, based on a user input provided through a document creation platform 180 (700). If the user 101 decides to create a new document, the enhanced document creation system 110 may select a document template based on one or more user attributes in a user profile associated with the user 101, which may be retrieved from user database 117 (710). The enhanced document creation system 110 may create an initial document 150 in accordance with the selected template, which may be encoded in accordance with a defined schema and stored as a structured document in document database 116 (711).

Alternatively, if the user 101 decides to work from an existing document, the user 101 may upload an unenhanced document through document creation platform 180 (720). The enhanced document creation system 110 may parse the document using document parsing software to extract information from the unenhanced document (721). The enhanced document creation system 110 may analyze the extracted information to determine the presence of one or more sections in the uploaded document, and may create an initial document 150 having equivalent sections (722). The initial document 150 may be encoded in accordance with a defined schema and stored as a structured document in document database 116 in association with a unique document identifier. The enhanced document creation system 110 may also populate the sections within the initial document 150 with information extracted using the parsing software (723). The enhanced document creation system 110 may encode the populated sections according to the defined schema and update the structured document in document database 116 and may assign a new document identifier.

The enhanced document creation system 110 may then present the initial document 150 to the user 101 through document creation platform 180 for the user 101 to view, export, or further modify (730). The user 101, for example, may have the ability to choose one or more sections of the initial document 150 to edit, and based on a user selection of a particular section (740), the enhanced document creation system 110 may present the user 101 with a form corresponding to the section for the user 101 to edit (732). The user 101 may edit the contents and formatting of the section through the form presented to the user 101 (741). Once complete, the enhanced document creation system 110 may encode the section and update the structured document in document database 116 accordingly (732). This process may continue until a determination is made that the user 101 is finished editing the document (730).

Figure 8:
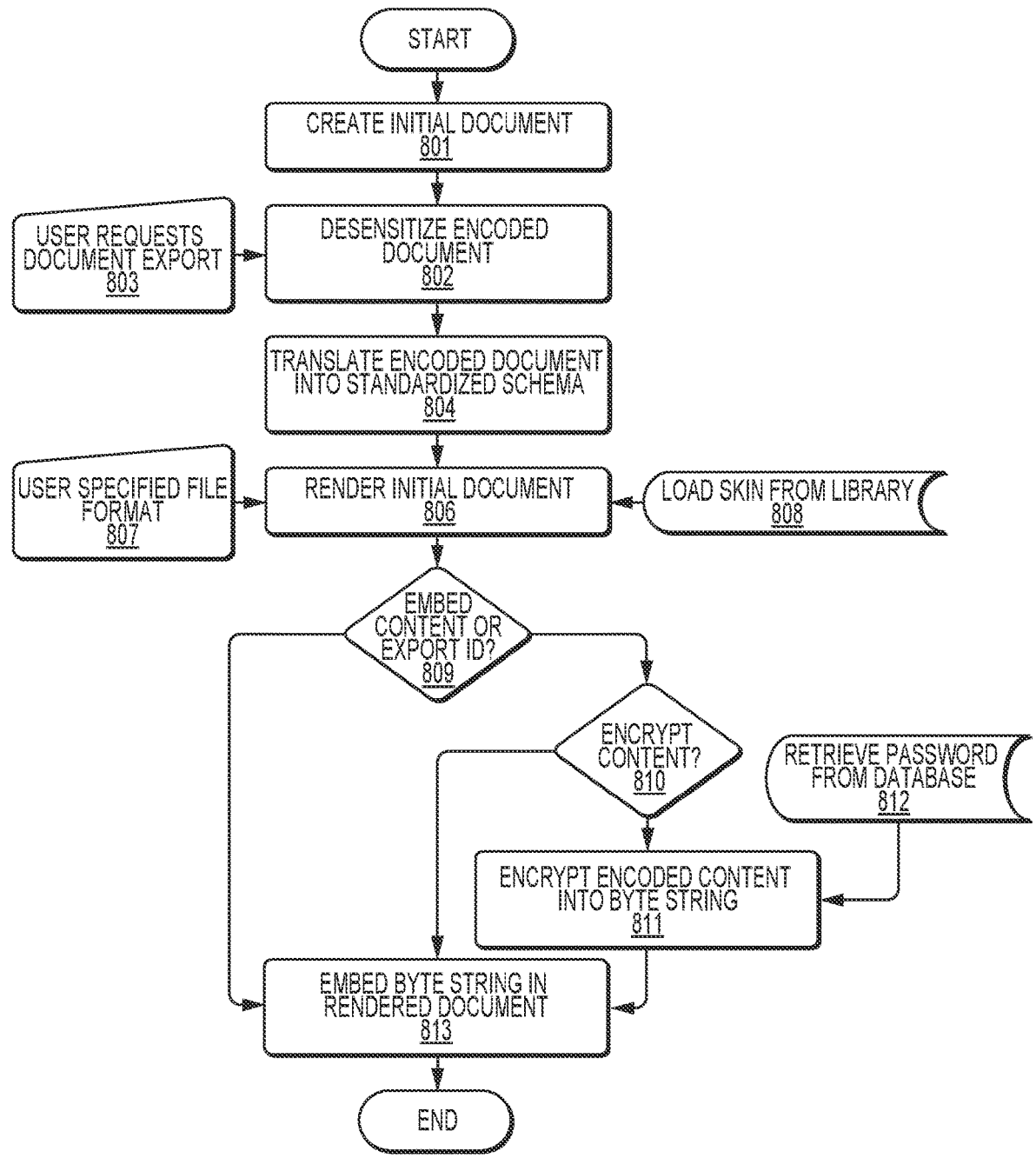
FIG. 8 depicts a high-level logic flow that the enhanced document creation system may employ in exporting an initial document as an enhanced document.

FIG. 8 depicts a high-level logic flow that the enhanced document creation system 110 may employ in exporting an enhanced document 151. The process may begin with the creation of an initial document 150 via the document creation platform 180 provided by the enhanced document creation system 110, which may be encoded in accordance with a defined schema and stored as a structured document in document database 116 in association with a unique document identifier (801). In response to a user request to export the initial document 150 (803), the enhanced document creation system 110 may retrieve the structured document from document database 117 and desensitize the document by removing any sensitive information (e.g., SSN, photograph, etc.) (802). The enhanced document creation system 110 may then translate the structured document into a standardized schema (804). The enhanced document creation system 110 may use this desensitized document to render the initial document 150 in a particular file format (e.g., Microsoft Word's DOCX format or Adobe Acrobat's PDF format) (806), which in some embodiments, may be designated by a user 101 (807). The initial document 150 may be rendered in accordance with a particular skin definition, which may be loaded from skin library 114a (808). The enhanced document creation system 110 may then determine whether to embed the structured document in the rendered document (created at 806) or whether to embed the document identifier associated with the structured document. (809). If the structured document is to be embedded, the enhanced document creation system 110 may further determine whether the structured document is to be encrypted (810). If so, the structured document may be encrypted into an encrypted byte string according to a particular encryption algorithm (811), which in some embodiments, may rely on an encryption password retrieved from encryption password database 115 (812). The exported document identifier, structured document, or encrypted structured document may then be embedded as a byte string in the rendered document (created at 806) forming the enhanced document 151 (813).

Figure 9:
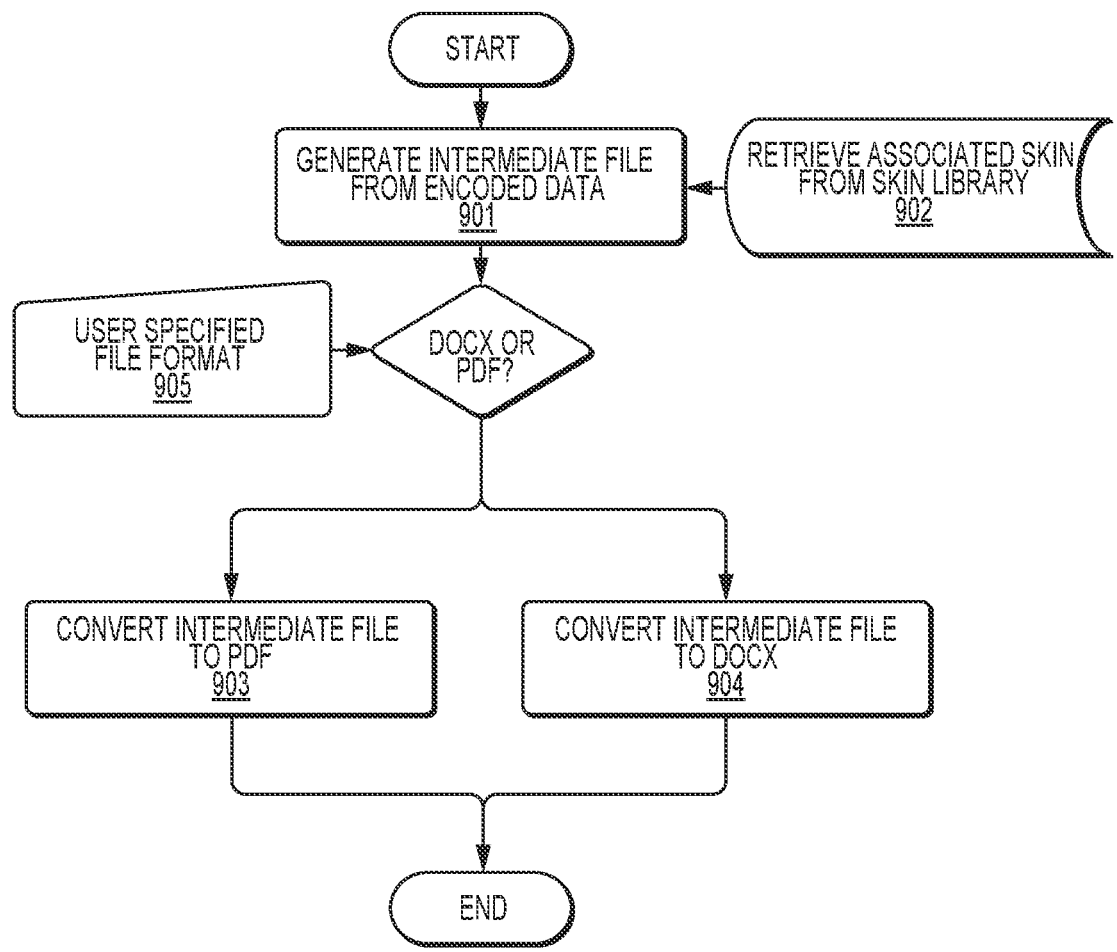
FIG. 9 depicts an exemplary logic flow that the enhanced document creation system may employ in rendering a structured document.

FIG. 9 provides an exemplary logic flow that an embodiment of the enhanced document creation system 110 may employ in rendering a structured document. As illustrated, the process may begin by generating an intermediate file based on the structured document (901), where the positioning and style (e.g., layout, font, line weights, spacing, margins etc.) of document content may be provided by a skin definition associated with the document retrieved from skin library 114a (902). The enhanced document creation system 110, for example, may generate an HTML file comprising different HTML elements, with specified CSS styles, along with a linked CSS stylesheet to control the position and style (i.e., the visual appearance) of the document content. The enhanced document creation system 110 may then convert the intermediate file into a particular file format, like Microsoft Word's DOCX format (903) or Adobe Acrobat's PDF format (904), which may depend on the file format specified by the user 101 (905).

Figure 10:
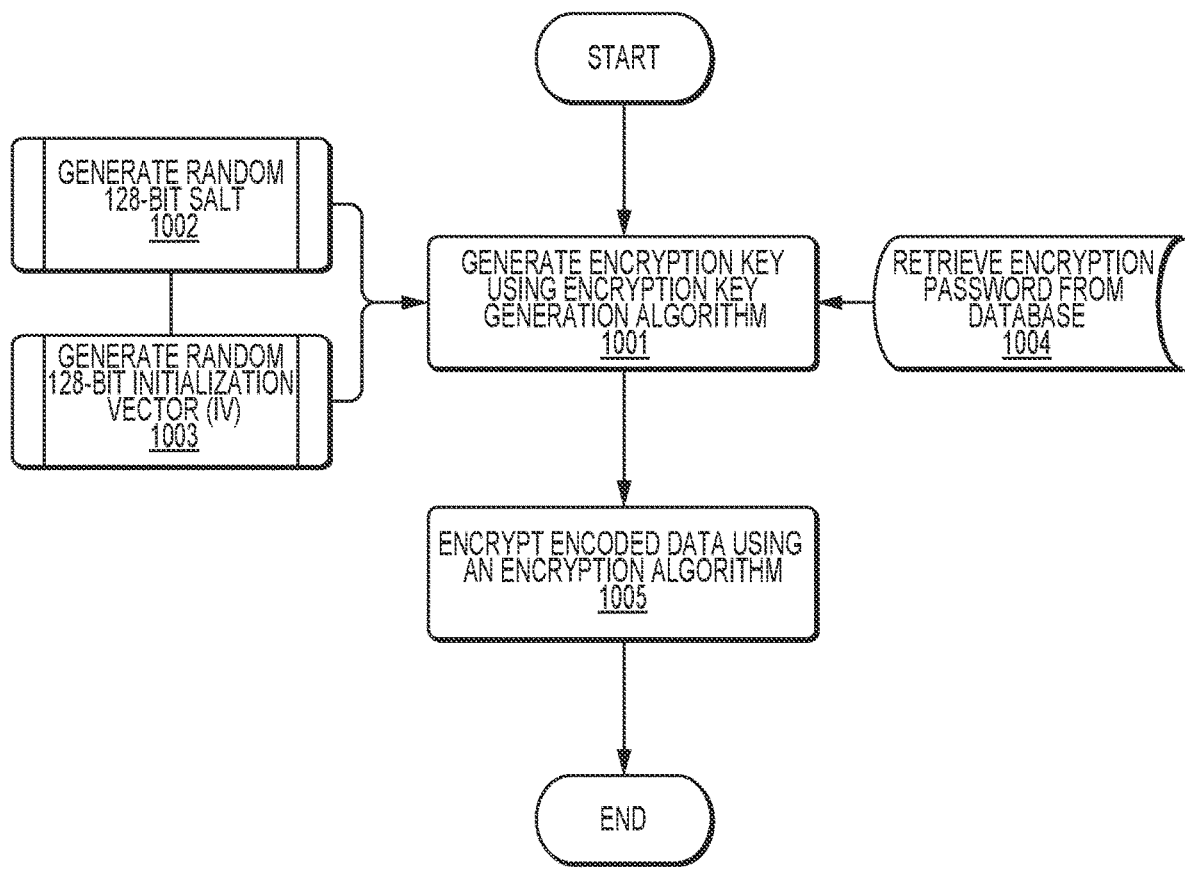
FIG. 10 depicts an exemplary logic flow that the enhanced document creation system may employ to encrypt a structured document.

FIG. 10 provides an exemplary logic flow that an embodiment of the enhanced document creation system 110 may employ in encrypting a structured document. As illustrated, the process may begin with the enhanced document creation system 110 generating an encryption key using an encryption key generation algorithm such as PBKDF2 (1001), which may take one or more of a salt, an initialization vector, and a password as parameters in generating the encryption key. Generating the encryption key, thus, may further require generating a random 128-bit salt (1002), generating a random 128-bit initialization vector (1003), and retrieval of an encryption password from encryption password database 115 (1004). The enhanced document creation system 110 may then encrypt the encoded content using an encryption algorithm such as AES (1005) to create an encrypted byte string of the structured document.

Figure 11:
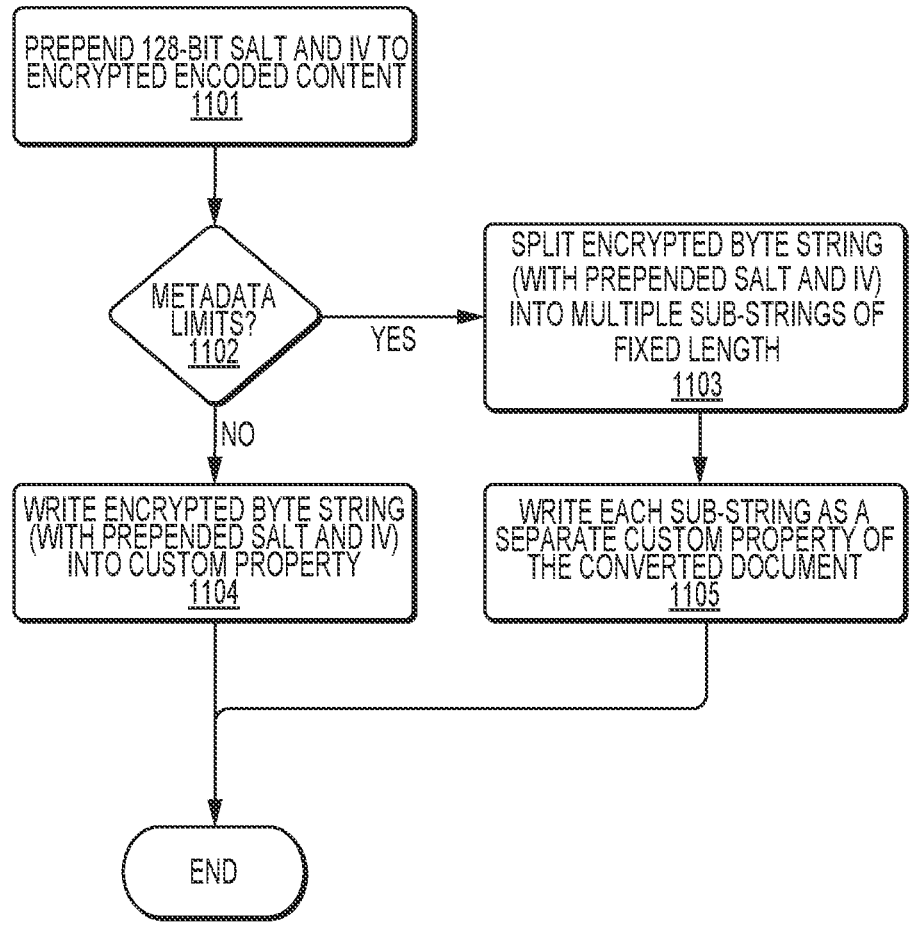
FIG. 11 depicts an exemplary logic flow that the enhanced document creation system may employ to embed encrypted content in a rendered document.

FIG. 11 depicts an exemplary logic flow that an embodiment of the enhanced document creation system 110 may employ to embed encrypted content into a rendered document. As illustrated, the process may begin with the enhanced document creation system 110 prepending the salt and initialization vector, which were randomly generated, to the encrypted byte string (1101). In embodiments where the enhanced document creation system 110 acts as an encryption licensing server, the process may additionally, or alternatively, involve prepending an encryption key identifier to the encrypted byte string. The enhanced document creation system 110 may then make a determination, based on the file format of the converted document, of whether there are any limits placed on the form that metadata may be embedded into in the converted file format (1102). Microsoft Word DOCX files and Adobe Acrobat PDF files, for example, may store metadata as "custom properties" in the form of ID-value pairs, with the "custom properties" in Microsoft Word DOCX files being further limited to strings of 255 characters in length, or less. In the case of Adobe Acrobat PDF files, the enhanced document creation system 110 may write the encrypted byte string, with the prepended salt and initialization vector, as a single ID-value pair thereby forming the enhanced document 151 (1104). Alternatively, in the case of Microsoft Word DOCX files, the enhanced document creation system 110 may split the encrypted byte string into multiple strings (1103), which may be written to the converted document in sequence as a series of ID-value pairs, thereby forming the enhanced document 151 (1105). While the foregoing describes the embedding of encrypted content, it should be appreciated that the encoded content need not be encrypted and can be embedded as an unencrypted byte string or that the exported document identifier may be embedded as a byte string.

Figure 12:
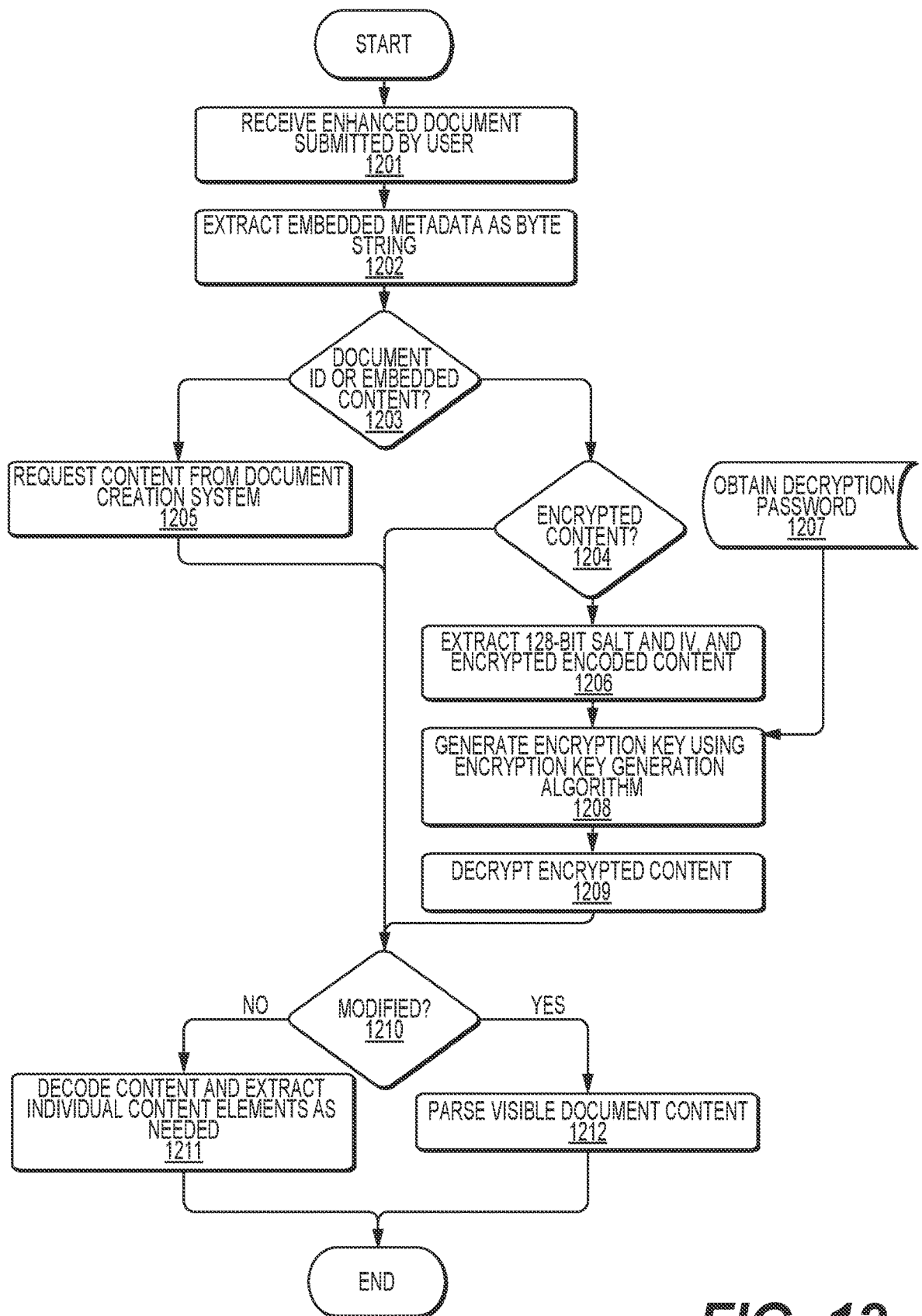
FIG. 12 depicts a high-level logic flow that the enhanced document parsing system may follow in parsing an enhanced document.

FIG. 12 depicts a high-level logic flow that a document parsing system may follow in parsing an enhanced document. As illustrated, the process may start with the submission of an enhanced document 151, for example, through document submission system 160 (1201). The document submission system 160 may pass the enhanced document 151 along to enhanced document parsing system 130 to be parsed, for example, by invoking a public or outward facing service. The enhanced document parsing system 130 may extract the embedded metadata from the enhanced document 151 to obtain a single extracted byte string (1202). Where the metadata consists of a series of ID-value pairs, enhanced document parsing system 130 may first concatenate the values in sequence (e.g., based on the IDs) to form the single extracted byte string.

The enhanced document parsing system 130 may then determine whether the extracted byte string represents an exported document identifier or structured content (1203), and in the case of the latter may further determine whether the structured content is encrypted (1204). If the extracted byte string represents an exported document identifier, the enhanced document parsing system 130 may request the associated structured document from the enhanced document creation system 110 (1205). In instances where the extracted metadata is encrypted, the enhanced document parsing system 130 may split the byte string into a salt and initialization vector, and encrypted content (1206). The enhanced document parsing system 130 may obtain the encryption password used to generate the encryption key used to encrypt the content (e.g., by requesting it from the enhanced document creation system 110) (1207), and may regenerate the encryption key using the encryption password and the salt and initialization vectors extracted from the non-visible metadata of the enhanced document 151 (1208). Alternatively, in embodiments where the enhanced document creation system 110 acts as an encryption licensing server, the enhanced document parsing system 130 may split the byte string into an encryption key identifier and encrypted content. The enhanced document parsing system 130 may then submit a request for an encryption key to the enhanced document creation system 110, the request including a license key for the enhanced document parsing system 130 and the encryption identifier extracted from the non-visible metadata embedded in the document. The enhanced document parsing system 130 may then use the generated or returned encryption key to decrypt the encrypted content extracted from the metadata of the enhanced document 151 to obtain the structured document (1209).

Once the structured document has been obtained, the enhanced document parsing system 130 may determine whether the enhanced document 151 has been modified since it was first created (1210). If a determination is made that the document has not been modified, the enhanced document parsing system 130 may decode the structured document and extract individual content elements as needed (1211). Alternatively, if a determination is made that the enhanced document 151 has been modified, the enhanced document parsing system 130 may employ traditional parsing techniques to parse the visible content of the enhanced document 151 (1212).

Figure 13:
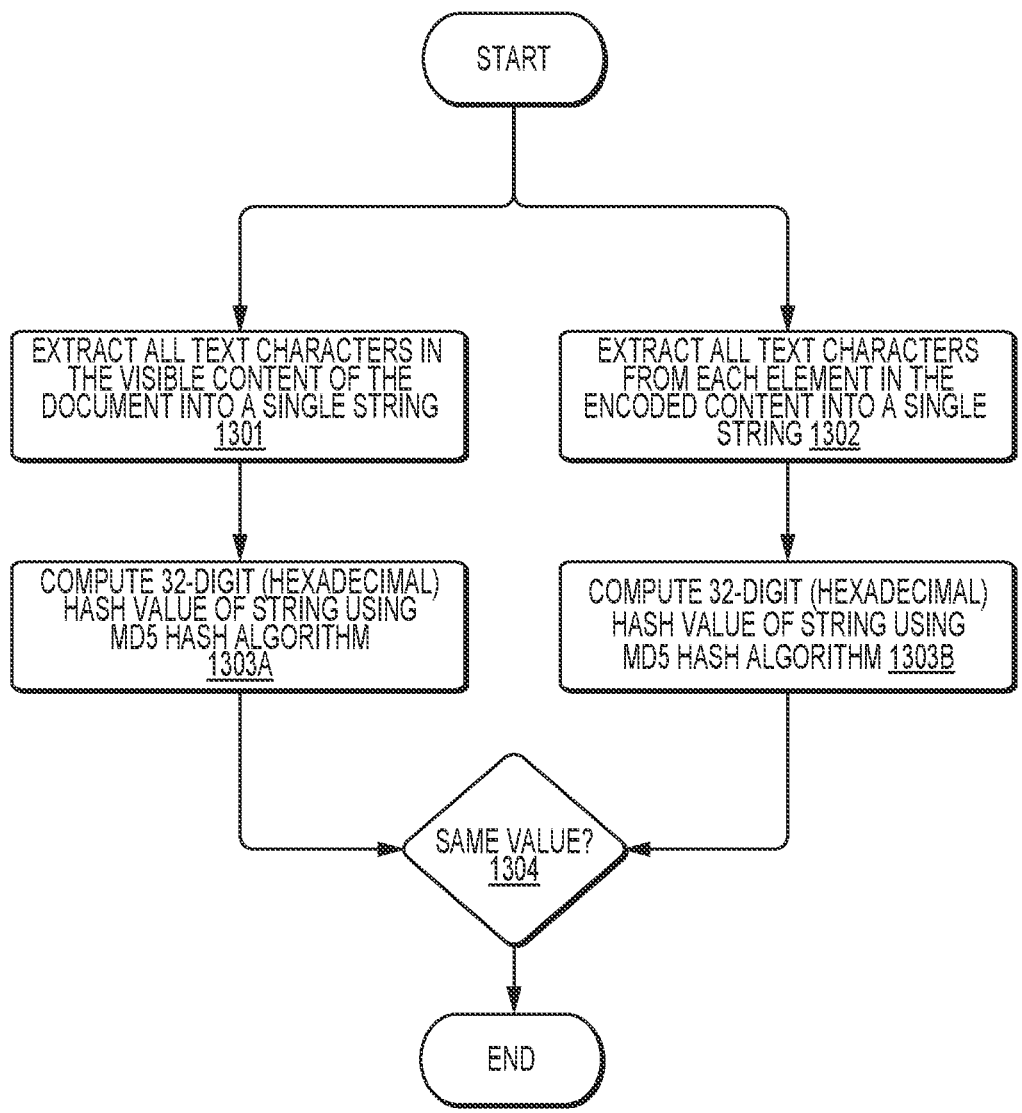
FIG. 13 depicts an exemplary logic flow that the enhanced document parsing system may employ to determine whether an enhanced document has been modified.

FIG. 13 depicts an exemplary logic flow that the enhanced document parsing system 130 may employ to determine whether a previously exported document has been modified. The process may begin with the enhanced document parsing system 130 extracting all text characters in the visible content of the enhanced document 151 into a single string. (1301) The enhanced document parsing system 130 may also extract all text characters (including whitespace) in each element of the structured document into a single string, with the elements being processed in their exact order of appearance in the structured document (1302). The enhanced document parsing system 130 may then compute a hash value of each string using the MD5 hash algorithm (1303a, 1303b) and compare the values together (1304). If the computed hash values are identical, the document is unmodified. Conversely, if the hash values are different, the visible content of the enhanced document 151 has been changed in some way. In embodiments where an exported document identifier is embedded in the enhanced document 151, a similar process may be employed. The enhanced document parsing system 130, for example, may compute the hash value of the visible content of the enhanced document 151 (as in 1301, 1303a) and transmit the computed hash value to the enhanced document creation system 110 as part of a request for the structured document associated with the exported document identifier. The enhanced document creation system 110 may then compute the hash value of the structured document associated with the exported document identifier stored in document database 116 (as in 1302, 1303b), and may compare the hash value received from the enhanced document parsing system 130 to the computed hash value to determine whether the document has been modified (as in 1304). If the hash values match, the enhanced document creation system 110 may determine that the enhanced document 151 has not been modified since export and may return the structured document to the enhanced document parsing system 130.

While specific embodiments of the invention have been described above, it will be appreciated that the invention may be practiced other than as described. The embodiment(s) described, and references in the specification to "one embodiment," "an embodiment," "an example embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The description provided above is intended to be illustrative and non-limiting. Thus, it will be apparent to one skilled in the art that modifications may be made to the present invention as described without departing from the scope of the claims set out below. For instance, while the foregoing may describe the embedding of encrypted content, it should be appreciated that the encoded content need not be encrypted and can be embedded as an unencrypted byte string. Moreover, while the above description was provided with reference to the creation and parsing of an enhanced resume document, the invention is not thus limited, and may be naturally extended to other contexts. The enhanced document creation and parsing systems, for example, may be used to create enhanced tax filing documents.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed:

1. A method of processing an enhanced document by a document parsing system, the method comprising:
   receiving an enhanced document at the document parsing system, the enhanced document having nonvisible metadata embedded therein;
   examining a document file type of the enhanced document to determine if the enhanced document is one of a predefined list of document types for which verification is required to determine if the enhanced document has been modified or not;
   extracting encoded content from the nonvisible metadata embedded in the enhanced document; and
   transmitting the encoded content as a structured document to a document submission platform,
   wherein the metadata is stored as ID and value pairs, and wherein extracting the encoded content further comprises:
      accessing one or more encrypted byte string segments in the embedded metadata of the enhanced document, each encrypted byte string segment having an associated identifier;
      assembling the one or more encrypted byte string segments into an encrypted byte string;
      selecting an initial portion of the encrypted byte string as an encryption salt and initialization vector, and truncating the initial portion from the encrypted byte string; and
      obtaining an encryption password from an encryption password database;
      decrypting the truncated encrypted byte string using a decryption key generated using the encryption password, salt and initialization vector according to a decryption algorithm to obtain content encoded in accordance with a defined document schema, the encoded content comprising one or more elements, having one or more fields and corresponding field values.

2. The method of claim 1, further comprising:
if the enhanced document is one of the predefined list of document types, verifying that the enhanced document has not been modified prior to extracting the encoded content.

3. The method of claim 1, further comprising:
registering the enhanced document with a document creation system;
receiving a notification when the enhanced document has been updated; and
requesting an updated version of the enhanced document after receiving the notification.

4. The method of claim 1, further comprising:
transmitting a status notification to a document creation system upon successful extraction of the encoded content.

5. A document parsing system comprising:
at least one processor; and
a memory in communication with the processor, the memory having a plurality of instructions stored thereon,
where the processor is configured to execute the instructions to:
receive an enhanced document at the document parsing system, the enhanced document having nonvisible metadata embedded therein;
examine a document file type of the enhanced document to determine if the enhanced document is one of a predefined list of document types for which verification is required to determine if the enhanced document has been modified or not;
extract encoded content from the nonvisible metadata embedded in the enhanced document; and
transmit the encoded content as a structured document to a document submission platform,
wherein the metadata is stored as ID and value pairs, and wherein the processor in extracting the encoded content is further configured to execute the instructions to:
   access one or more encrypted byte string segments in the embedded metadata of the enhanced document, each encrypted byte string segment having an associated identifier;
   assemble the one or more encrypted byte string segments into an encrypted byte string;
   select an initial portion of the encrypted byte string as an encryption salt and initialization vector, and truncating the initial portion from the encrypted byte string;
   obtain an encryption password from an encryption password database; and
   decrypt the truncated encrypted byte string using a decryption key generated using the encryption password, salt and initialization vector according to a decryption algorithm to obtain content encoded in accordance with a defined document schema, the encoded content comprising one or more elements, having one or more fields and corresponding field values.

6. The document parsing system of claim 5, wherein the processor is further configured to execute the instructions to:

if the enhanced document is one of the predefined list of document types, verify that the enhanced document has not been modified prior to executing the instructions to extract the encoded content.

7. The document parsing system of claim 5, wherein the processor is further configured to execute the instructions to:
register the enhanced document with a document creation system;
receive a notification when the enhanced document has been updated; and
request an updated version of the enhanced document after receiving the notification.

8. The document parsing system of claim 5, wherein the processor is further configured to execute the instructions to:
transmit a status notification to a document creation system upon successful extraction of the encoded content.

9. A non-transitory computer-readable medium comprising a plurality of instructions, the instructions being executable by a processor to:
receive an enhanced document at the document parsing system, the enhanced document having nonvisible metadata embedded therein;
examine a document file type of the enhanced document to determine if the enhanced document is one of a predefined list of document types for which verification is required to determine if the enhanced document has been modified or not;
extract encoded content from the metadata embedded in the enhanced document; and
transmit the encoded content as a structured document to a document submission platform,
wherein the metadata is stored as ID and value pairs, and wherein the instructions for extracting the encoded content are further executable to:
access one or more encrypted byte string segments in the embedded metadata of the enhanced document, each encrypted byte string segment having an associated identifier;
assemble the one or more encrypted byte string segments into an encrypted byte string;
select an initial portion of the encrypted byte string as an encryption salt and initialization vector, and truncating the initial portion from the encrypted byte string;
obtain an encryption password from an encryption password database; and
decrypt the truncated encrypted byte string using a decryption key generated using the encryption password, salt and initialization vector according to a decryption algorithm to obtain content encoded in accordance with a defined document schema, the encoded content comprising one or more elements, having one or more fields and corresponding field values.

10. The non-transitory computer-readable medium of claim 9, wherein the instructions are further executable to:
if the enhanced document is one of the predefined list of document types, verify that the enhanced document has not been modified prior to extracting the encoded content.

11. The non-transitory computer-readable medium of claim 9, wherein the metadata is stored as ID and value pairs, and wherein the instructions for extracting the encoded content are further executable to:
register the enhanced document with a document creation system;
receive a notification when the enhanced document has been updated; and
request an updated version of the enhanced document after receiving the notification.

\* \* \* \* \*